(12) United States Patent
Norton et al.

(10) Patent No.: US 10,111,275 B2
(45) Date of Patent: Oct. 23, 2018

(54) SCHEDULING FAILOVER FOR LIGHTING CONTROLS

(71) Applicant: ABL IP HOLDING LLC, Conyers, GA (US)

(72) Inventors: Mark Norton, Oxford, GA (US); Christopher Trickler, Loganville, GA (US); Dean Naib, Loganville, GA (US); Richard L. Westrick, Jr., Social Circle, GA (US)

(73) Assignee: ABL IP HOLDING LLC, Conyes, GA (US)

( * ) Notice: Subject to any disclaimer, the term of this patent is extended or adjusted under 35 U.S.C. 154(b) by 204 days.

(21) Appl. No.: 15/229,149

(22) Filed: Aug. 5, 2016

(65) Prior Publication Data
US 2018/0042064 A1 Feb. 8, 2018

(51) Int. Cl.
*H04W 76/18* (2018.01)
*H04W 76/02* (2009.01)
*H04W 4/00* (2018.01)
*H04W 76/06* (2009.01)
*H04W 72/12* (2009.01)
(Continued)

(52) U.S. Cl.
CPC ........... *H04W 76/18* (2018.02); *H04W 4/005* (2013.01); *H04W 4/06* (2013.01); *H04W 4/70* (2018.02); *H04W 72/121* (2013.01); *H04W 76/027* (2013.01); *H04W 76/068* (2013.01); *H04W 76/38* (2018.02)

(58) Field of Classification Search
CPC .................................................. H04W 76/027
See application file for complete search history.

(56) References Cited

U.S. PATENT DOCUMENTS 7,911,359 B2 * 3/2011 Walters .................. G06Q 30/04
340/870.11
8,594,976 B2 * 11/2013 Dorogi ................... G01R 31/44
315/132

(Continued)

OTHER PUBLICATIONS

Fresco User Guide Based on FW 103.18, dated Aug. 17, 2015, 27 pages.

(Continued)

*Primary Examiner* — Parth Patel
(74) *Attorney, Agent, or Firm* — RatnerPrestia

(57) ABSTRACT

A lighting control system of networks and devices designed to allow scheduled events to continue to operate in the case of partial or full network operation and failure. The lighting control system can rely on any network controller to act as a schedule master that evaluates a schedule of time-based lighting control events. When failure of the acting schedule master occurs or network communication therewith, the lighting control system changes the scheduling master to a different network controller based on a fail over protocol. The failover protocol includes detecting when an acting schedule master controller stops working by, for example, failing to receive a keep-alive message at a different network controller within a predetermined amount of time. Upon detecting failure of the schedule master controller, a network controller with a different controller identifier takes over as the schedule master in accordance with a controller identifier evaluation or protocol.

19 Claims, 13 Drawing Sheets

(51) Int. Cl.
*H04W 4/06* (2009.01)
*H04W 4/70* (2018.01)
*H04W 76/38* (2018.01)

(56) References Cited

U.S. PATENT DOCUMENTS

| | | | | |
|---|---|---|---|---|
| 8,936,194 B1* | 1/2015 | Welch | | G06K 7/1417 |
| | | | | 235/435 |
| 9,459,601 B2* | 10/2016 | Morrow | | G05B 15/02 |
| 9,520,742 B2* | 12/2016 | Brown | | H05B 37/034 |
| 9,600,983 B1* | 3/2017 | Lydecker | | G08B 5/36 |
| 9,736,914 B2* | 8/2017 | Pakkala | | H05B 37/0272 |
| 9,784,817 B2* | 10/2017 | Lydecker | | G01S 5/16 |
| 2003/0135625 A1* | 7/2003 | Fontes | | H04L 63/12 |
| | | | | 709/228 |
| 2005/0007985 A1* | 1/2005 | Park | | H04L 45/04 |
| | | | | 370/338 |
| 2007/0234032 A1* | 10/2007 | Chen | | G06F 13/385 |
| | | | | 713/100 |
| 2008/0136334 A1* | 6/2008 | Robinson | | H05B 37/0254 |
| | | | | 315/151 |
| 2008/0183337 A1* | 7/2008 | Szabados | | H05B 37/0254 |
| | | | | 700/296 |
| 2008/0288607 A1* | 11/2008 | Muchow | | G06F 9/44505 |
| | | | | 709/209 |
| 2009/0001892 A1* | 1/2009 | Van Boekhout | | H05B 37/0227 |
| | | | | 315/149 |
| 2009/0021955 A1* | 1/2009 | Kuang | | H05B 33/0803 |
| | | | | 362/479 |
| 2009/0182921 A1* | 7/2009 | Lin | | G06F 13/387 |
| | | | | 710/110 |
| 2011/0294431 A1* | 12/2011 | Erdmann | | H04W 40/246 |
| | | | | 455/41.2 |
| 2012/0154454 A1* | 6/2012 | Ohishi | | G09G 3/342 |
| | | | | 345/690 |
| 2013/0089157 A1* | 4/2013 | Chu | | H04L 61/2038 |
| | | | | 375/259 |
| 2014/0217903 A1* | 8/2014 | Platner | | H05B 37/0245 |
| | | | | 315/152 |
| 2014/0253437 A1* | 9/2014 | Vaught | | G02B 27/017 |
| | | | | 345/156 |
| 2014/0361888 A1* | 12/2014 | Huang | | G08B 5/36 |
| | | | | 340/539.1 |
| 2015/0372996 A1* | 12/2015 | Schrum, Jr. | | H04L 63/061 |
| | | | | 713/171 |
| 2016/0183347 A1* | 6/2016 | Morrison | | H05B 37/0227 |
| | | | | 315/152 |
| 2017/0308048 A1* | 10/2017 | Weber | | G05B 19/0423 |
| 2017/0359162 A1* | 12/2017 | Granqvist | | H04W 4/70 |
| 2017/0366672 A1* | 12/2017 | Newman | | H04M 3/56 |
| 2017/0371819 A1* | 12/2017 | Lin | | G06F 13/364 |
| 2018/0035513 A1* | 2/2018 | Magielse | | H05B 37/0227 |
| 2018/0049146 A1* | 2/2018 | Daley | | H04H 20/38 |

OTHER PUBLICATIONS

Dynamics Spaces Application Guide, Bringing Spaces to Life, 2016, 17 pages.
Canadian Office Action for Canadian Application No. 2,975,110, dated Jun. 6, 2018, 3 pages.

* cited by examiner

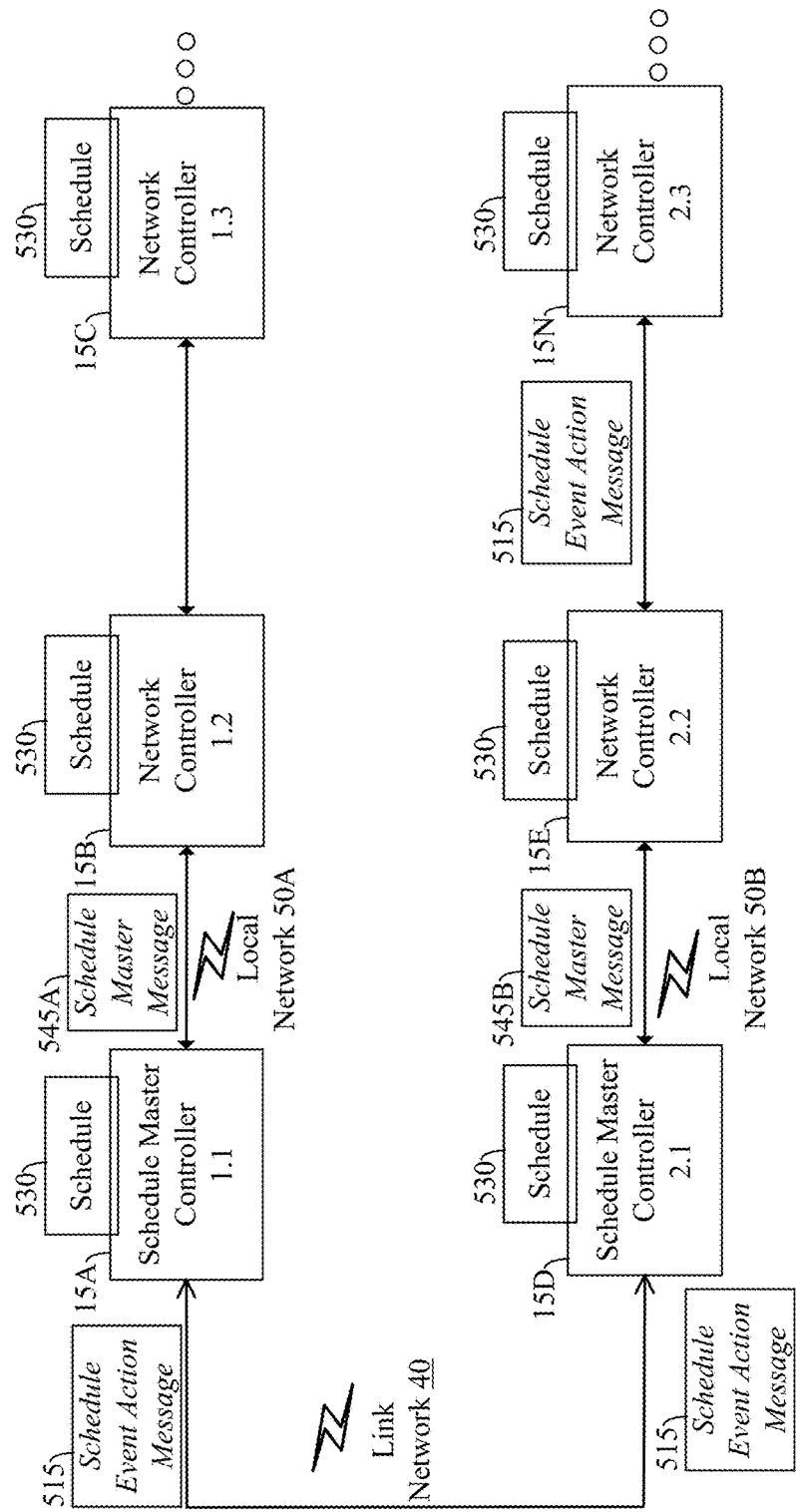

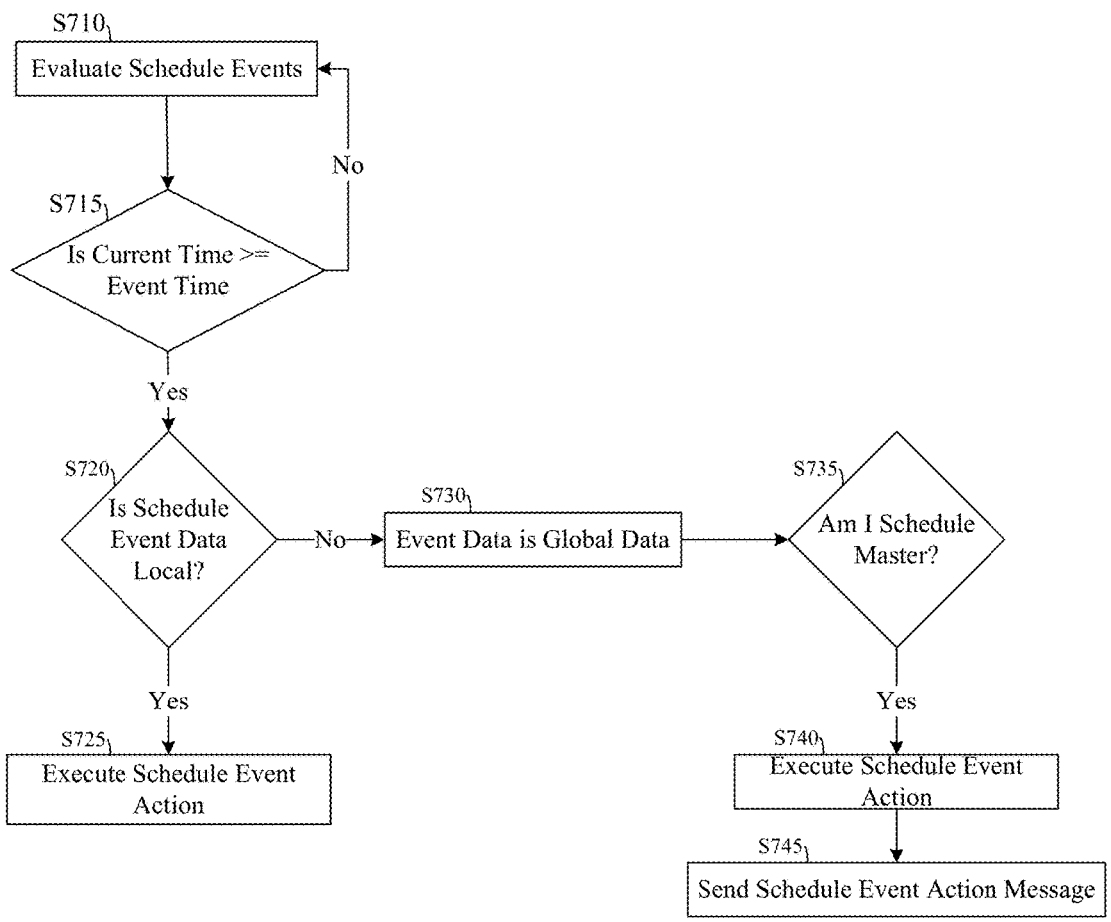

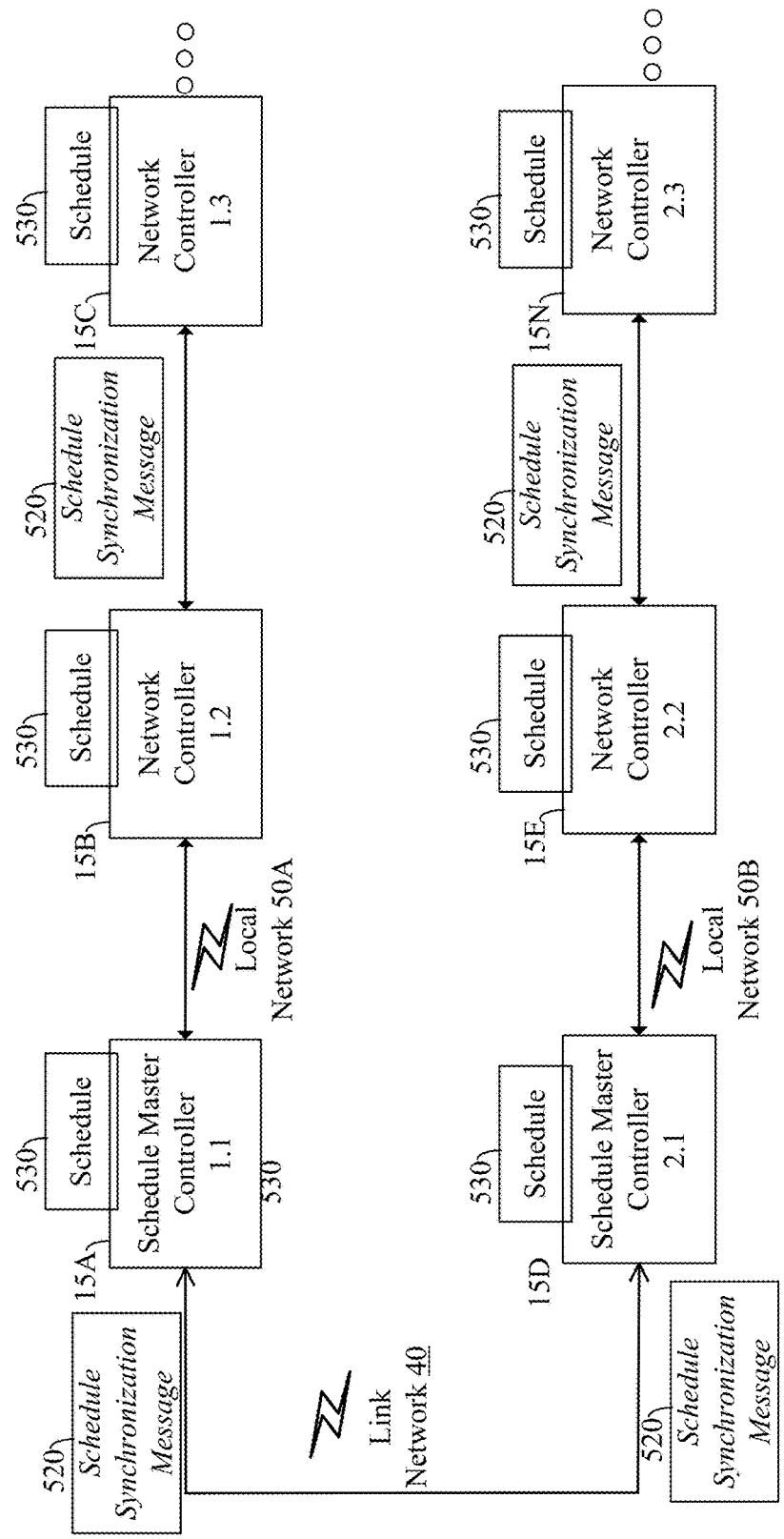

SCHEDULING FAILOVER FOR LIGHTING CONTROLS

BACKGROUND

Traditional luminaires can be turned ON and OFF, and in some cases may be dimmed, usually in response to user activation of a relatively simple input device. Often traditional luminaires are controlled individually or as relatively small groups at separate locations.

More sophisticated lighting control systems automate the operation of the luminaires throughout a building or residence based upon preset time schedules, occupancy, and/or daylight sensing. Such lighting control systems receive sensor signals at a central lighting control panel, which responds to the received signals by deciding which, if any, relays, switching devices, and/or dimming ballasts to drive in order to turn on or off and/or adjust the light levels of one or more luminaires. A scheduler, in or working with the control panel, stores information sometimes called "lighting control profiles" (or a "schedule"). Such a profile includes settings that will be applied at particular times or dates to a group of luminaires connected to the control panel or other node acting as the scheduler. All lighting control profiles are created in lighting control software and are stored within the node implementing the scheduler. Once programmed with one or more profiles, the scheduler sends out the settings specified in the profiles to the appropriate downstream luminaires according to a defined schedule.

Unfortunately, when the scheduling node stops working, the luminaires no longer receive lighting control profiles through the lighting system. For example, when the central lighting control panel that arbitrates a lighting control system is unavailable, the lighting control system may not work as expected (or according to the schedule). A lighting system is needed to overcome these and other limitations in the art.

SUMMARY

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In an example, a method includes connecting from a first network controller of a first plurality of network controllers to a network. The first plurality of network controllers control a respective luminaire. The method further includes receiving, within a timeout period, at the first network controller, a first schedule master message from a second network controller of the first plurality of network controllers via the network. The first schedule master message includes a source identifier of the second network controller and identifying the second network controller as a schedule master of a lighting control schedule having a sequence of lighting control events for the first plurality of network controllers on the network. The method further includes adjusting the respective luminaire controlled by the first network controller in accordance with the lighting control schedule. The method further includes upon failing to receive, within the timeout period, the schedule master message from the second network controller via the network, determining that the first network controller is the schedule master. The method also includes upon determining that the first network controller is the schedule master, transmitting, from the first network controller, a second schedule master message to the first plurality of network controllers indicating that the first network controller is the schedule master via the first network.

In an example, a first network controller includes a network communication interface system configured for data communication for communication of a local lighting schedule event action message, over a local network, with a first plurality of network controllers in communication over the local network that includes the first network controller. The network communication interface system is also configured for communication of a global lighting schedule event action message, over a link network, of at least two different schedule master controllers, the two different schedule master controllers connected to a separate network of respective network controllers. The network communication interface system is also configured for communication, over a lighting device network, with a dimmable luminaire to adjust lighting intensity of the dimmable luminaire based on the local lighting schedule event action message and the global lighting schedule event action message.

The first network controller further includes a processor coupled to the network communication interface system and a touch screen to receive user input of a local lighting control event to adjust a local group of luminaires controlled by the first plurality of network controllers on the local network to a first light intensity level at a first event time by generating the local lighting schedule event action message and further receive user input of a global lighting control event to adjust a global group of luminaires controlled by the at least two different schedule master controllers to a second light intensity level at a second event time by generating the global lighting schedule event action message. The first network controller further includes a memory accessible to the processor and programming in the memory which configures the processor to, upon failing to receive, within a timeout period, a schedule master message from an existing schedule master controller of the first plurality of network controllers via the local network, determine that the existing schedule master controller is not a schedule master of a lighting control schedule for the first plurality of network controllers on the local network. The lighting control schedule includes a sequence of lighting control events based on the local lighting schedule event action message and the global lighting schedule event action message.

The programming in the memory further configures the processor to, in response to determining that the existing schedule master controller is not the schedule master, determine that the first network controller is a current schedule master of the lighting control schedule for the first plurality of network controllers on the local network. The programming in the memory further configures the processor to, in response to determining that the first network controller is the current schedule master, repeatedly send, within a predetermined time period, to the first plurality of network controllers on the local network and the at least two different schedule master controllers on the link network, a new schedule master message including a source identifier of the first network controller and identifying the first network controller as the current schedule master for the first plurality of network controllers on the local network.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 6 is a block diagram of a lighting control system showing storage of the schedule of FIG. 5C and schedule process communications, such as transmission of the schedule event action message of FIG. 5B and the schedule master message of FIG. 5D.

FIGS. 7A-B are flow charts illustrating schedule process communications of the network controllers and schedule master controllers of FIG. 1.

FIG. 11 is a block diagram of a lighting control system showing automatic schedule synchronization process communications, such as transmission of the schedule synchronization message of FIG. 5B.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1:
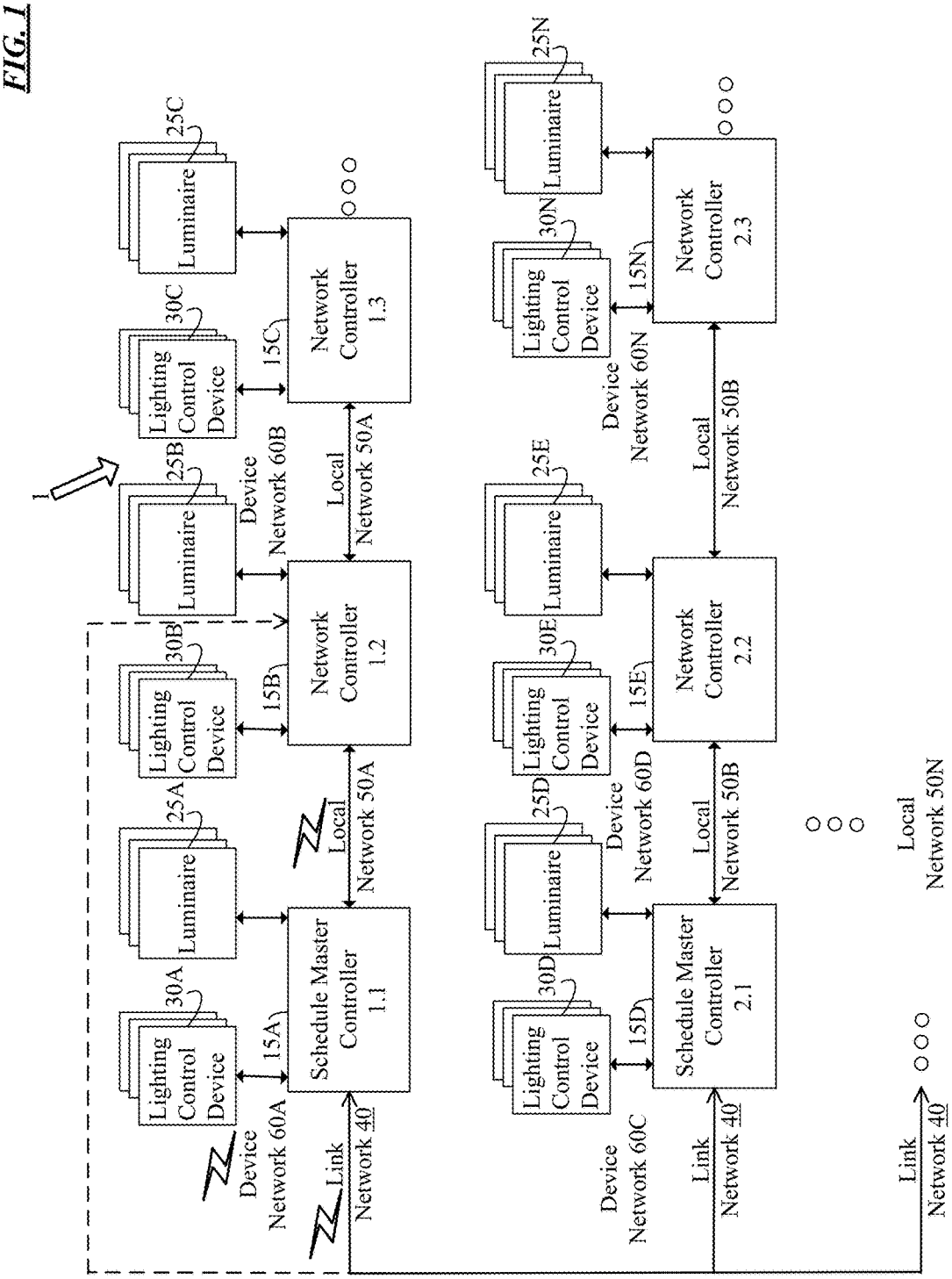
FIG. 1 is a high-level functional block diagram of an example of a lighting control system of networks and devices designed to allow schedule events or actions to continue to operate in the case of partial or full network operation and failure.

FIG. 1 illustrates a high-level functional block diagram of an example of a lighting control system 1 of networks and devices designed to allow schedule events or actions to continue to operate in the case of partial or full network operation and failure. The lighting control system 1 can rely on any of network controllers 15A-N to evaluate a schedule of schedule events which are timed-based lighting control events. Generally, network controllers 15A-N are nodes that act on events and control end devices within the lighting control system 1. Each network controller 15A-N has a unique identifier and hardware/software elements, such as a microprocessor, real time clock, user interface, storage, and networking components. Network controllers 15A-N can be a touch screen device (e.g., commercially available from Acuity Brands Lighting under the trade name Fresco®), a mobile device, such as a tablet computer or smartphone, a lighting management panel or module (e.g., under the trade name Fresco®), low voltage wall station (e.g., commercially available from Acuity Brands Lighting under the trade name nLight®), network wall switch sensors (e.g., under the trade name nLight®), or intelligent luminaire with on-board controls and sensors. Upon occurrence or generation of such a timed-based lighting control event in the schedule, a designated schedule master controller 15A, 15D communicates the schedule event information to other devices (luminaires 25A-N and lighting control devices 30A-N). It should be understood that a "lighting control profile" or "schedule" comprises one or more lighting control events and typically a schedule is created at the scheduling node or within software and put on the scheduling node.

As shown, luminaires 25A-N and lighting control devices 30A-N are connected to the acting schedule master via a local network 50A-N although the connection passes through a respective device network 60A-N. When full or partial failure of the acting schedule master controller or network communication therewith occurs, the lighting control system 1 changes the schedule master to a different network controller 15A-N based on a failover protocol procedure. In contrast to a lighting system that relies on a single controlling device, the illustrated lighting control system 1 functions as intended even in the event of network failure.

The luminaires 25A-N do not have to be directly connected to respective network controllers 15A-N or schedule master controllers 15A, 15D (which can serve as a control panel) in order to receive lighting-based controls. For example, because luminaires 25A-N are controlled by respective lighting control device 30A-N, some or all communication destined to or from respective network controllers 15A-N or schedule master controllers 15A, 15D related to lighting control events is via respective lighting control devices 30A-N. Hence, luminaires 25A-N can be indirectly connected to respective network controllers 15A-N or schedule master controllers 15A, 15D through respective lighting control devices 30A-N in order to receive lighting-based controls. In other words, luminaires 25A-N can be driven or controlled by lighting control devices 30A-N via device networks 60A-N. Of note, several network controllers 15A-N or lighting control devices 30A-N can control a single luminaire 25A-N.

The failover protocol procedure includes, for example, detecting when a functioning schedule master controller 15A stops working. For example, when a keep-alive is not received at network controller 15B from the current schedule master controller 15A within a predetermined amount of time this indicates failure. Upon detecting failure, a network controller with a different controller identifier takes over in accordance with a controller identifier evaluation or protocol. For example, the lowest controller identifier takes over responsibility of sending scheduling events. For example, network controller 15B (controller identifier 1.2) takes over as the schedule master controller for local network 50A in the event that schedule master controller 15A (controller identifier 1.1). Network controller 15C (controller identifier 1.3) does not take over because its respective controller identifier is higher. The comparison does not have to be lower, it could be higher, so long as there is a comparison in the controller identifier evaluation or protocol.

Lighting control system 1 stores a redundant schedule at multiple nodes/locations (network controllers 15A-N) on the lighting control network (e.g., link network 40 and local network 50A-N) and can manage or evaluate the schedule at any of the network controllers 15A-N. Thus, in case of full or partial failure, the lighting control system 1 continues to operate normally. Additionally, changes to the schedule events that comprise the schedule are maintained synchronously across the illustrated link network 40, local networks 50A-N, and device networks 60A-N, to ensure consistent and successful operation of the lighting control system 1. Consequently, the lighting control system 1 maintains identical schedule data to ensure continuous and correct operation by guaranteeing no data loss.

The network topology of lighting control system 1 includes a collection of system components comprised of network controllers 15A-N, luminaires 25A-N (e.g., light fixtures, table lamps, floor lamps, or night lights) and lighting control devices 30A-N. The light fixture is, for example, a recessed cove fixture, under-cabinet lighting, direct/indirect pendant lighting, a recessed can, wall wash lighting, a wall sconce, task lighting, and a recessed fluorescent light, a chandelier, a ceiling fan light, an outdoor yard light, etc. The system components are connected by a specific combination of hierarchal wired, wireless, and virtual connections. The illustrated networks 40, 50A-N, and 60A-N can be via nLight® (commercially available from Acuity Brands Lighting), digital multiplex (DMX) control, Fresco® control network (FCN) (commercially available from Acuity Brands Lighting), Ethernet, a local area network, (LAN, e.g., Intranet), a wide area network (WAN, e.g., Internet), wireless mesh network (e.g., ZigBee), and a personal area network (e.g., Bluetooth or Z-Wave). FCN, DMX control, nLight®, and Z-Wave are lighting-centric networks that control a variety of luminaires, and therefore are utilized for local networks 50A-N and device networks 60A-N, in the example. The link network 40 may be a LAN, such as Intranet, or Internet, in our example. Accordingly, link network 40, local networks 50A-N, and device networks 60A-N may utilize different communication protocols, for example, the lighting control system 1 is a hierarchical network. The link network 40, local networks 50A-N, and device networks 60A-N are separate networks but with a shared application protocol for scheduling. It should be appreciated, however, that link network 40, local networks 50A-N, and device networks 60A-N may be a different part of the same network tree or star network, and therefore are not separate networks and can utilize the same network communication protocols.

Multiple network controllers 15A-N may be connected by a separate network defined as a link network 40. Certain network controllers 15A-N are designated as schedule master controllers 15A, 15D. The network controllers 15A-N that are currently acting as schedule master controllers 15A, 15D are connected by link network 40 to allow for the passing/transmission of global schedule events (time-based lighting controls that span link network 40). The separation of networks 40, 50A-N, 60A-N in this hierarchal method allows for isolation of network communication, events, and errors to a particular network.

Subsets of network controllers 15A-N are connected by a particular local network 50A-N to allow for transmission of local schedule events (time-based lighting controls that span a particular local network 50A-N). As shown, network controllers 15A-C are in communication via local network 50A. Network controller 15B connects to a respective luminaire 25B via a wireless device network 60B, such as a lighting-centric wireless communication network, that is totally separate from local network 50A and link network 40. Also, local network 50A and link network 40 are each separate wired or wireless communication networks.

Designation of which of network controllers 15A-N act as a schedule master controller on a particular local network 50A-N changes. For example, upon failure of schedule master controller 15A, network controller 15B is designated as schedule master controller of local network 50A and connects to link network 40. for the passing of local schedule events (time-based lighting controls).

Luminaires 25A-N (luminaires) and lighting control devices 30A-N are connected to a particular network controller 15A-N by a device network 60A-N to allow for transmission of both local schedule events specific to a respective local network 50A-N or global schedule events for the entire link network 40. As shown, luminaire 25A and lighting control device 30A are in communication with schedule master controller 15A via device network 60A. Further, luminaire 25D and lighting control device 30D are in communication with network controller 15D via device network 60D. Through a respective network controller 15A-N, luminaires 25A-N and lighting control devices 30A-N are networked with other devices on a respective device network 60A-N.

A variety of lighting controls are transmitted over networks 40, 50A-N, and 60A-N, including, controls to turn lights on/off, adjust dimming level (dim up/down), set scene (e.g., a predetermined light setting), and sensor trip events. The lighting controls are transmitted in the form of a schedule event, a schedule, and related schedule messages, such as a schedule event action message, a schedule synchronization message. Each network controller 15A-N, luminaire 25A-N, and lighting control device 30A-N, can be equipped with wireless transceiver(s), such as a near range Bluetooth Low Energy (BLE) radio. To allow for wireless communication over all three types of networks 40, 50A-N, and 60A-N, each of the network controllers 15A-N, luminaires 25A-N, and lighting control devices 30A-N may include separate radios that operate at three different frequencies, such as sub-GHz (e.g., 900 MHz), Bluetooth Low Energy (BLE 2.4 GHz), and 5 GHz, for example.

Luminaires 25A-N can be dimmable, such as a dimmable light fixture, and comprise light emitting diodes (LEDs) that emit red, green, and blue (RGB) light or tunable white light. Luminaires 25A-N are coupled to respective lighting control devices 30A-N to receive schedule events (time-based lighting control events) and related messages via a respective network controller 15A-N. Daylight, occupancy, and audio sensors or switches can be embedded in lighting control devices 30A-N, luminaires 25A-N, or even network controllers 15A-N to enable schedule events to be generated and transmitted via network controllers 15A-N based on occupancy and dimming adjustments, for example.

Following is an example of a scheduling failover protocol executed by the lighting control system 1. A first network controller 15B of a first plurality of network controllers 15A-C connects to a first local network 50A. The first plurality of network controllers 15A-C control a respective luminaire, such as luminaires 25A-C. As shown, first network controller 15B controls luminaire 25B. First network controller 15B receives, within a timeout period (e.g., 5 seconds), a first schedule master message from a second network controller 15A of the first plurality of network controllers 15A-C via the first local network 50A. For example, the first schedule master message is received at the first network controller 15B from the second network controller 15A with a periodicity of 1 second. The first schedule master message includes a source identifier of the second network controller 15A and identifies the second network controller 15A as a schedule master of a lighting control schedule (also referred to herein as a "schedule") having a sequence of lighting control events for the first plurality of network controllers 15A-C on the first local network 50A.

The first network controller 15B adjusts the respective luminaire 25B controlled by the first network controller 15B in accordance with the lighting control schedule. Upon failing to receive, within the timeout period, the schedule master message from the second network controller 15A via the first local network 50A, the first network controller 15B determines that the first network controller 15B itself is the schedule master. Upon determining that the first network controller 15B itself is the schedule master, the first network controller 15B transmits a second schedule master message to the remaining first plurality of network controllers 15A, 15C indicating that the first network controller 15B is the schedule master via the first local network 50A.

Connecting from the first network controller 15B to the first local network 50A includes designating the first network controller 15B with a controller identifier that is unique to the first network controller 15B and a network identifier that represents a logical collection of the first plurality of network controllers 15A-C on the first local network 50A. The transmitted second schedule master message includes the controller identifier of the first network controller 15B as the source identifier.

After designating itself the schedule master, the first network controller 15B receives a third schedule master message from a third network controller 15C of the first plurality of network controllers 15A-C. The third schedule master message indicates that the third network controller 15C is the schedule master and includes the controller identifier of the third network controller 15C as the source identifier. In response, the first network controller 15B compares the controller identifier of the first network controller 15B with the third network controller 15C. Based on the comparison, the first network controller 15B designates the first network controller 15B or the third network controller 15C as the schedule master.

In an example, first network controller 15B determines which controller identifier is numerically lower and then determines that the first network controller 15B has the numerically lower controller identifier. Accordingly, first network controller 15B maintains the first network controller 15B itself as the schedule master.

Alternatively, first network controller 15B determines that the third network controller 15C has the numerically lower controller identifier. In response, first network controller 15B designates the third network controller 15C as the schedule master by storing the controller identifier of the third network controller as a schedule master identifier. After designating the third network controller 15C as the schedule master, first network controller 15B receives a schedule event action message including a schedule event (time-based lighting control adjustment). The received schedule event includes a light-related adjustment (such as lighting intensity or brightness adjustment), an event date, and an event time to make the lighting intensity or brightness adjustment (e.g., lumen output or photometric distribution). The light-related adjustment can also be a color adjustment (e.g., color point), a color temperature adjustment (e.g., correlated color temperature). The received schedule event may also designate a zone that specifies where to make the light-related adjustment. A zone is a group or collection of luminaires 25A-N that share space within an installation (e.g. a room or area) and may be defined by a zone identifier.

The schedule event action message further includes a source identifier of the third network controller 15C and a destination identifier that includes the controller identifier of the first network controller 15B. The first network controller 15B adjusts the respective luminaire 25B in accordance with the received schedule event action message from the third network controller 15C.

First network controller 15B also connects to a link network 40. Link network 40 includes a second plurality of network controllers 15D that are designated as the schedule master for a respective LAN 50A-N. For example, schedule master controller 15D is the schedule master for a second local network 50B. In response to determining that the first network controller 15B is the schedule master, the first network controller 15B transmits (e.g., broadcasts), on the link network 40, the second schedule master message to the second plurality of network controllers 15D indicating that the first network controller 15B is the schedule master of the first local network 50A.

After transmitting the second schedule master message on the link network 40, the first network controller 15B sends a schedule event action message including the source identifier of the first network controller 15B, a destination identifier, and a schedule event. The schedule event is a lighting intensity or brightness adjustment and a time to make the lighting intensity or brightness adjustment. The destination identifier of the schedule event action message identifies a second local network 50B, network controller 15E on the second local network 50B, or a zone that is a grouping luminaires 25A-N controlled by network controllers that are spread across different LANs 50A, 50B and are controlled in a same manner. For example, the destination identifier is a list of controller identifier(s) of network controllers that are to carry out adjustments to their respective luminaires 25A-N in accordance with the schedule event or a list of network identifier(s) of local networks whose attached network controllers are to carry out adjustments to their respective luminaires 25A-N in accordance with the schedule event.

The schedule event action message further includes an event date that is assigned to a day, weekday, or range of days to make the lighting intensity or brightness adjustment. Schedule event action message is sent upon determining that the event date and the event time is triggered.

After transmitting the second schedule master message to the first plurality of network controllers 15A-C indicating that the first network controller 15B is the schedule master via the first local network 50A, first network controller 15B receives input, via a user interface of the first network controller 15B, to adjust a group of luminaires 25A-C controlled by the first plurality of network controllers 15A-C of the first local network 50A. First network controller 15B generates a lighting schedule event (also referred to herein as a "schedule event") based on the received input to adjust luminaires. The lighting schedule event includes a lighting intensity or brightness adjustment and an event time to make the lighting intensity or brightness adjustment to the group of luminaires controlled by the first plurality of network controllers 15A-C of the first local network 50A. First network controller 15B sends a schedule synchronization message to the first plurality of network controllers 15A-C on the first local network 50A that includes the source identifier of the first network controller 15B, a destination identifier identifying the first plurality of network controllers 15A-C (e.g., a list of respective controller identifiers), the generated lighting schedule event, and the lighting control schedule of the schedule master.

Upon generating the lighting schedule event, first network controller 15B stores the generated lighting schedule event in local persistent (non-volatile) or volatile storage of the first network controller 15B as configuration or control data. The stored configuration or control data represents a status of the lighting intensity or brightness adjustment for a zone corresponding to the group of luminaires 25A-C controlled by the first plurality of network controllers 15A-C of the first local network 50A.

Adjusting the respective luminaire (luminaire 25B) controlled by the first network controller 15B in accordance with the lighting control schedule includes receiving a schedule synchronization message. This schedule synchronization message comprises a lighting schedule event that is a lighting intensity or brightness adjustment, an event date and an event time to make the lighting intensity or brightness adjustment, the source identifier of the second network controller 15A, and a destination identifier identifying the first network controller 15B. First network controller 15B stores the schedule synchronization message by updating the lighting control schedule stored in local persistent or volatile storage of the first network controller 15B. The first network controller 15B then evaluates the lighting control schedule to determine if the event date and the event time are triggered. Upon determining the event date and the event time are triggered, first network controller 15B changes illumination of the respective luminaire (luminaire 25B) based on the lighting intensity or brightness adjustment of the lighting schedule event.

Figure 2A:
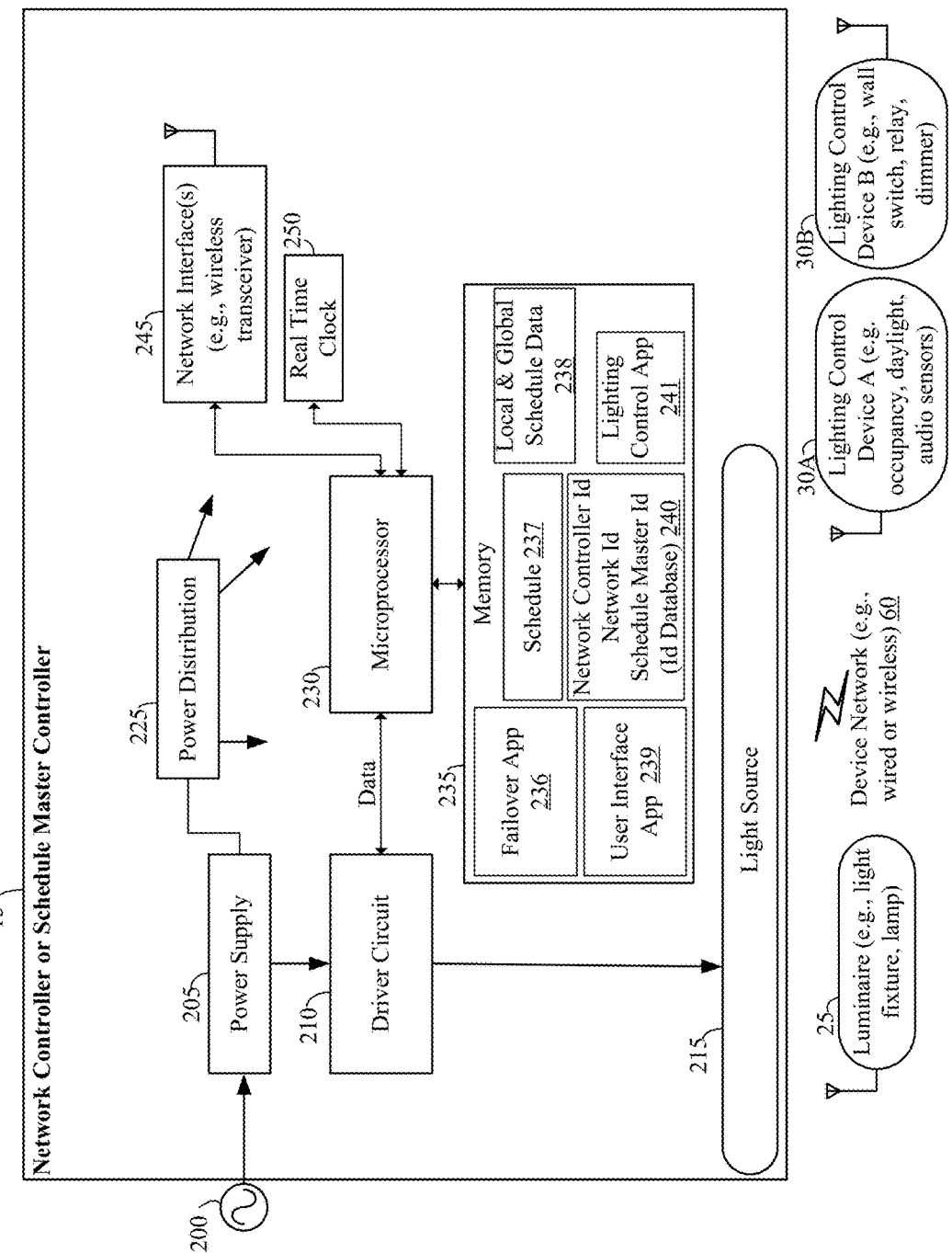
FIGS. 2A-B are block diagrams of a network controller or a schedule master controller that communicate via the lighting control system of FIG. 1.
Figure 2B:
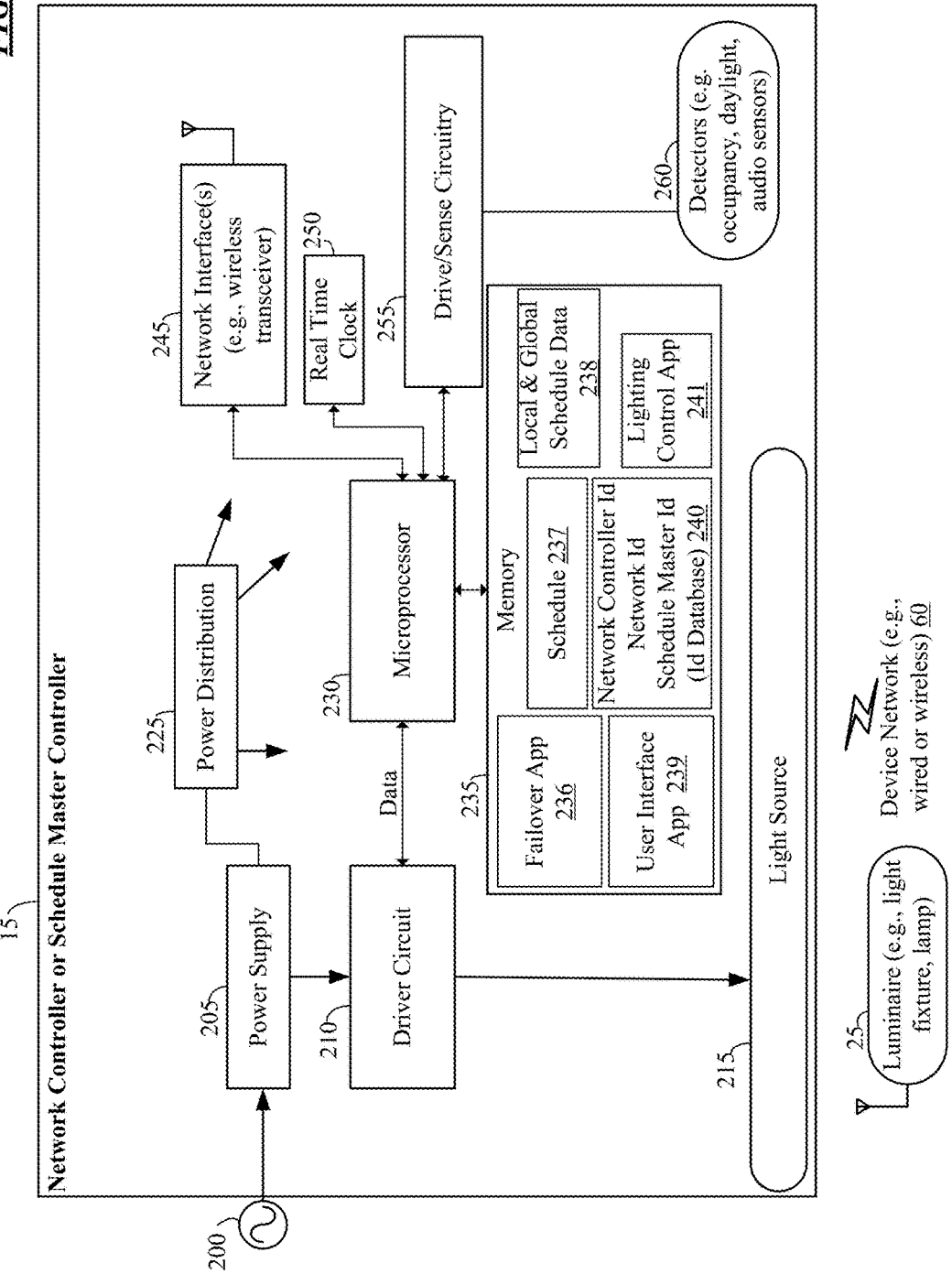

FIGS. 2A-B are block diagrams of a network controller (or a schedule master controller) 15 that communicate via the lighting control system of FIG. 1 Two different architectures are shown for the network controller 15 in FIGS. 2A-B. As shown in FIG. 2A, the network controller 15 is in communication with a luminaire 25 (e.g., a luminaire or lamp), lighting control device 30A (e.g. occupancy, daylight, or audio sensors), and lighting control device 30B (e.g., wall switch, relay, or dimmer). In FIG. 2B, drive/sense circuitry 255 and detectors 260 are on-board the network controller 15. Detectors 260 can be infrared sensors for occupancy or motion detection, an in-fixture daylight sensor, an audio sensor, a temperature sensor, or other environmental sensor. Drive/sense circuitry 255, such as application firmware, drives the occupancy, audio, and photo sensor hardware. It should be understood that network controller 15 may not necessarily include driver circuit 210, light source 215, or drive/sense circuitry 255 as part of the network controller 15 structure because control of a luminaire does not have to reside within the network controller 15 itself.

Network controller 15 can be an integrated luminaire (or a standalone touchscreen device) that includes a power supply 205 driven by a power source 200. Power supply 205 receives power from the power source 200, such as an AC mains, battery, solar panel, or any other AC or DC source. Power supply 205 may include a magnetic transformer, electronic transformer, switching converter, rectifier, or any other similar type of circuit to convert an input power signal into a power signal suitable for light source 215. Light source 215 can include light emitting diodes (LEDs) that emit red, green, and blue (RGB) light or tunable white light.

Network controller 15 further includes, a driver circuit 210, for example, an intelligent LED driver circuit. Driver circuit 210 is coupled to light source 215 and drives that light source 215 by regulating the power to light source 215 by providing a constant quantity or power to light source 215 as its electrical properties change with temperature, for example. The driver circuit 210 provides power to light source 215. Driver circuit 210 may be a constant-voltage driver, constant-current driver, or AC LED driver type circuit that provides dimming through a pulse width modulation circuit and may have many channels for separate control of different LEDs or LED arrays that comprise light source 215. An example of a commercially available intelligent LED driver circuit 210 is manufactured by EldoLED.

Driver circuit 210 can further include an AC or DC current source or voltage source, a regulator, an amplifier (such as a linear amplifier or switching amplifier), a buck, boost, or buck/boost converter, or any other similar type of circuit or component. Driver circuit 210 outputs a variable voltage or current to the light source 215 that may include a DC offset, such that its average value is nonzero, and/or a AC voltage.

For purposes of communication and control, network controller 10 is treated as a single or a multi-addressable device that can be configured to operate as a member of a link network 40, a respective local network 50A-N, and a respective device network 60A-N. If the network controller 15 is a luminaire, then network controller 15 is line powered and remains operational as long as power is available. Alternatively, if network controller 15 is a touch screen type device as described in FIG. 4B, network controller 15 may be battery powered.

Network controller 15 includes power distribution circuitry 225, a microprocessor 230, a memory 235, and a real time clock 250. As shown, microprocessor 230 is coupled to driver circuit 210 and the microprocessor 230 includes a central processing unit (CPU) that controls the light source operation of the light source 215. Memory 235 can include volatile and non-volatile storage. The real time clock 250 in conjunction with a real time operating system (RTOS) programming stored in the memory 235 (not shown) support multiple concurrent processing threads for different simultaneous control or scheduling failure communication operations of the network controller 10.

The power distribution circuitry 225 distributes power and ground voltages to the microprocessor 230, memory 235, network interface(s) 245 (e.g., wireless transceivers), real time clock 250, drive/sense circuitry 255, and detector (s) 260 to provide reliable operation of the various circuitry on the network controller 15.

Network interface(s) 245 allows for data communication (e.g., wired or wireless) over all three types of networks 40, 50A-N, and 60A-N. For example, network controller 15 includes a tri-band wireless radio communication interface system configured for wireless communication via separate radios that operate at three different frequencies, such as sub-GHz (e.g., 900 MHz), BLE (2.4 GHz), and 5 GHz, for example. A first transceiver of such a network communication interface system is for communication of local lighting schedule event action messages, over a first local network, with a first plurality of network controllers in communication over the first local network that includes a first network controller. A second transceiver is for communication of global lighting schedule event action messages, over a link network, of at least two different schedule master controllers, the two different schedule master controllers connected to a separate LAN of respective network controllers. A third transceiver is for communication, over a lighting device network, with a luminaire (e.g., a dimmable light fixture) to adjust lighting intensity of the luminaire based on the local lighting schedule event action messages and the global lighting schedule event action messages.

Microprocessor 230 serves to perform various operations, for example, in accordance with instructions or programming executable by microprocessor 230. For example, such operations may include operations related to communications with luminaire 25, lighting control devices 30A-B, and other network controllers during the failover protocol procedure and lighting control schedule process. Although a processor may be configured by use of hardwired logic, typical processors are general processing circuits configured by execution of programming. Microprocessor 230 includes elements structured and arranged to perform one or more processing functions, typically various data processing functions. Although discrete logic components could be used, the examples utilize components forming a programmable CPU. A microprocessor 230 for example includes one or more integrated circuit (IC) chips incorporating the electronic elements to perform the functions of the CPU. The microprocessor 230, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in network controller 15, luminaires 25A-N, and lighting control devices 30A-N, network elements, etc.

Memory or storage system 235 is for storing data and programming. In the example, the memory system 235 may include a flash memory (non-volatile or persistent storage) and a random access memory (RAM) (volatile storage). The RAM serves as short term storage for instructions and data being handled by the microprocessor 230, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with communications during the failover protocol procedure and lighting control schedule process of network controller 15. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 230, or a memory of a computer used to download or otherwise install such programming into the network controller 15, or a transportable storage device or a communications medium for carrying program for installation in the network controller 15.

As shown, the network controller 15 includes programming in the memory 235 which configures the microprocessor 230 to control operations of the light source 215, including the communications over the network interface(s) 245 via the tri-band wireless radio communication interface system. The programming in the memory 235 includes a failover application 236, a user interface application 239, and lighting control application 241. The memory also stores an identifier database 240 that includes a network controller identifier, local network identifier, and schedule master identifier. Network controller identifier is a unique numeric (or alphanumeric) identifier of the network controller 15 and, in some cases, signifies the priority of one network controller over another regarding how messages are handled (e.g., designation of which is the schedule master controller). Network controller identifier is unique per local network and the network identifier and the network controller identifier represent the overall uniqueness of the network controller 15. Network identifier is a unique numeric (or alphanumeric) identifier of the local network that the network controller 15 exists on. The network identifier may also represent a logical collection of network controllers on different and separate local networks, for example, network identifier can be a zone identifier.

The memory 235 further comprises a schedule 237 and local and global schedule data 238. Local data stored as the local and global schedule data 238 is configuration or control data which resides within only a specific network controller 15 and other network controllers on a respective local network of the specific network controller 15. An instance of one such type of local data may be a sensor timeout that applies. A sensor timeout can represent time delay information regarding a sensor triggering an action, whereby the sensor is a specific lighting control device 30A connected to the specific network controller 15. Global data stored as local and global schedule data 238 is configuration or control data which resides within any number of network controllers or all network controllers. An instance of one such type of global data may be a zone that spans multiple local networks. A zone can represent the status of the lighting intensity for a collection of similarly-controlled dimmable luminaires. The schedule 237 stored in memory 235 is described with reference to FIG. 5C.

User interface application 239 receives user input of a local lighting control event (i.e., a schedule event), for example, via a touch screen of network controller 15. The local lighting control event is to adjust a local group of luminaires controlled by a first plurality of network controllers (including first network controller 15) on a first local network to a first light intensity level at a first event time. The input may also include a global lighting control event (i.e., a schedule event) to adjust a global group of luminaires controlled by at least two different schedule master controllers to a second light intensity level at a second event time.

Lighting control application 241 generates a local lighting schedule event action message based on the touch screen received user input via the user interface application 239 to adjust the local group of luminaires controlled by the network controllers of the first local network. The lighting schedule event action message includes the first light intensity level and the first event time to adjust to the first light intensity level. The local lighting schedule event is stored as local data in the local and global schedule data 238. Lighting control application 241 sends the local lighting schedule event action message to the first plurality of network controllers on the first local network.

Figure 4A:
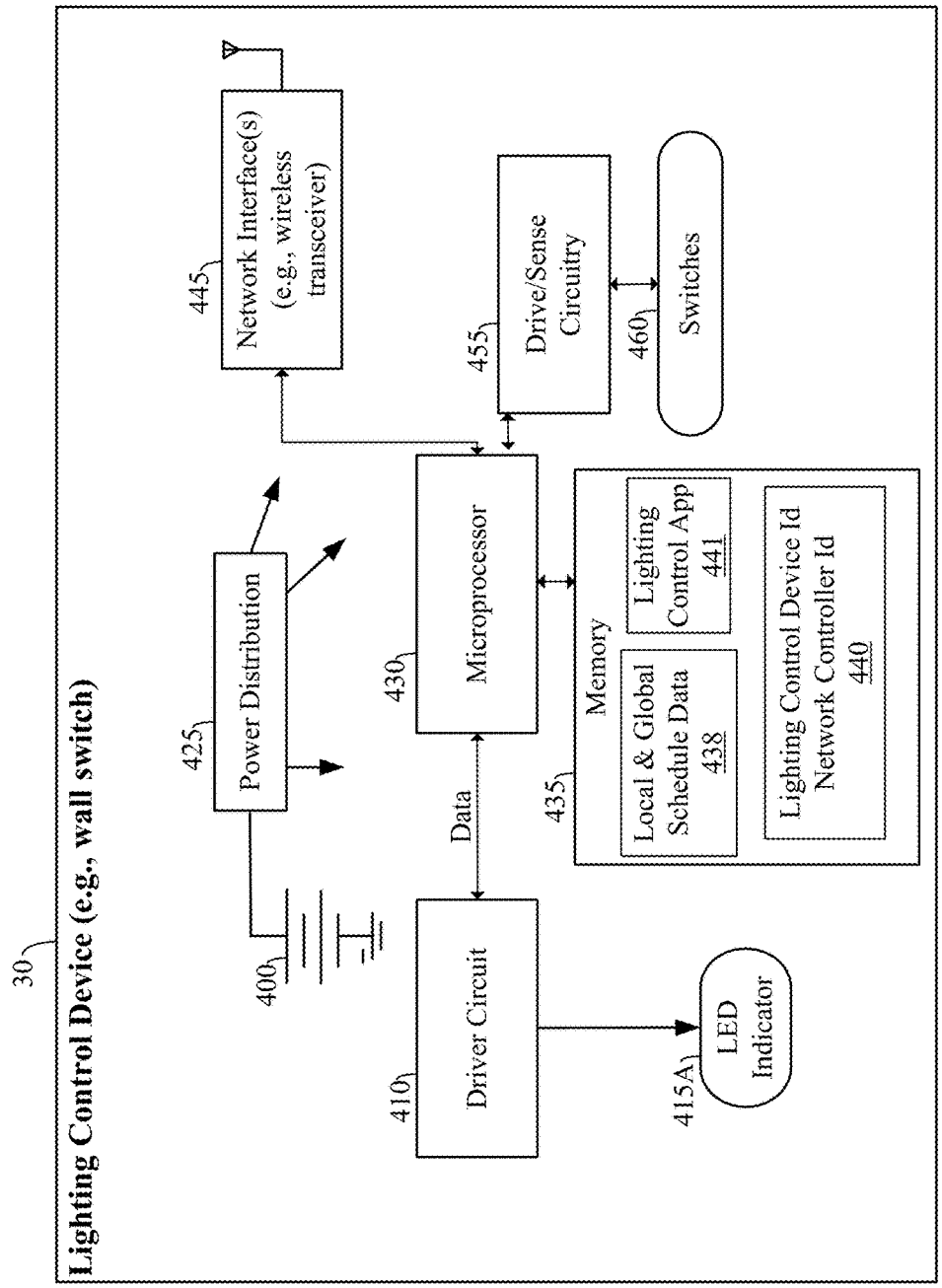
FIGS. 4A-B are block diagrams of lighting control devices that communicate via the lighting control system of FIG. 1
Figure 4B:
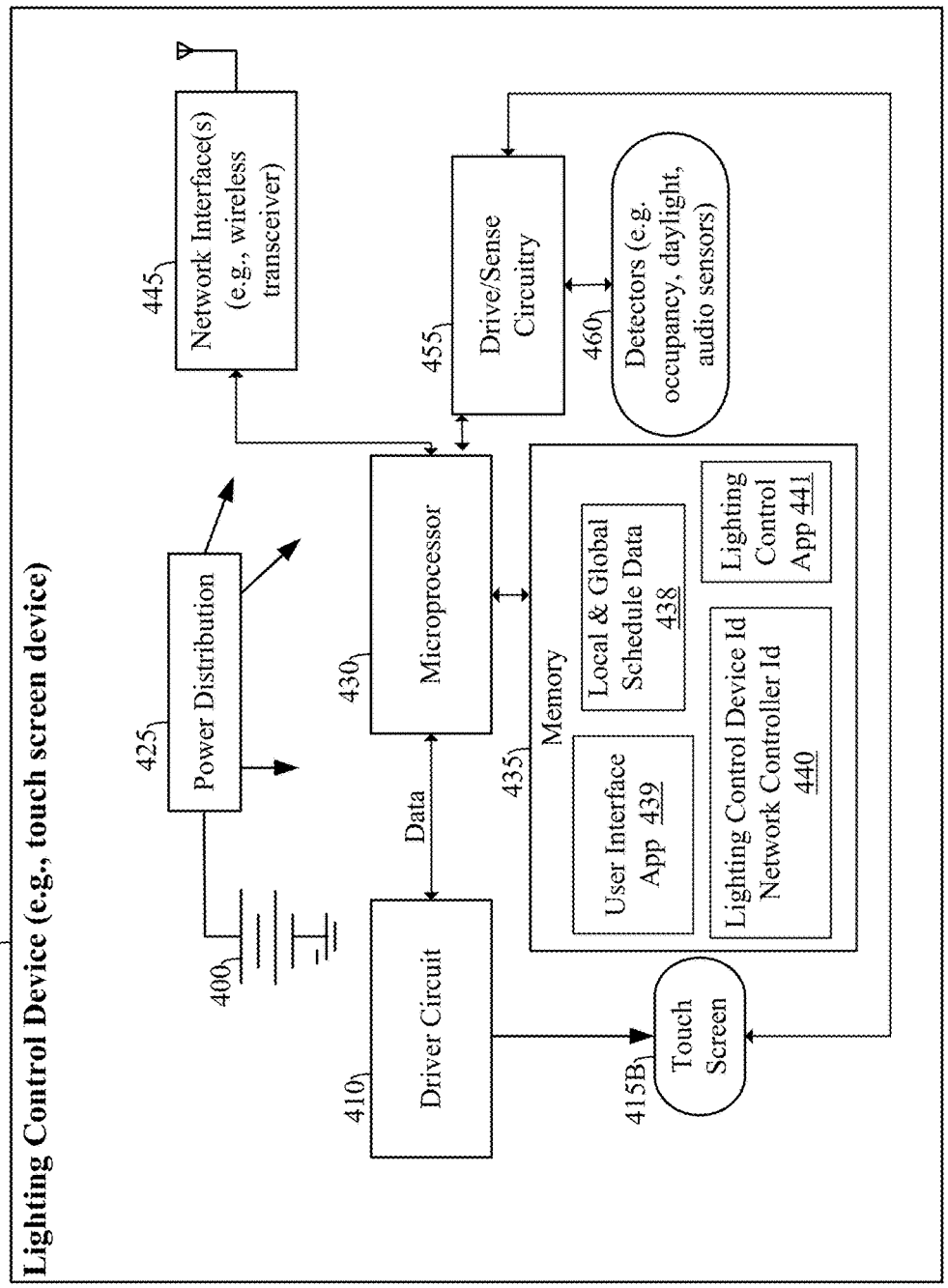

Lighting control application 241 also generates a global lighting schedule event action message based on the touch screen received user input (see description of touch screen and drive/sense circuitry in FIG. 4B) via the user interface application 239 to adjust a global group of dimmable luminaires 25 controlled by the at least two different schedule master controllers. The global lighting schedule event action message includes the second light intensity level and the second event time to adjust to the second light intensity level. The lighting control application 241 sends the global lighting schedule event action message to the at least two different master schedule network controllers on the link network.

Lighting control application 241 of the network controller 15 may also receive schedule event action messages from lighting control devices 30A-B to make lighting control schedule adjustments. For example, the lighting control device 30A may embed a source identifier in the schedule event action message, such as a stored lighting fixture identifier from its memory and a destination identifier, such as a stored network controller identifier of network controller 15 from its memory. Upon receipt of the schedule event action message from the lighting control device 30A, the network controller 15 checks the source identifier and the destination identifier parameters (to determine whether the source identifier is a lighting control device residing on the respective device network and that the destination identifier is the network controller identifier of the receiving network controller 15). Network controller 15 will discard if the source identifier and the destination identifier checks are not determined to match or the message is a duplicate.

If the network controller 15 determines that the source identifier and the destination identifier are a match, the message payload is extracted from the schedule event action message and processed by the lighting control application 241 running on the processor 230 so that the schedule is updated and pushed out across network(s) accordingly.

Failover application 236 is firmware/software that engages in communications with the network controllers 15A-N over the link network 40 and respective local network 50A-N to carry out scheduling failover. For example, upon failing to receive, within a timeout period, a schedule master message from an existing schedule master controller of a first plurality of network controllers via a first local network, failover application 236 determines that the existing schedule master controller is not a schedule master of a lighting control schedule for the first plurality of network controllers on the first local network. The lighting control schedule includes a sequence of lighting control events based on the local lighting schedule event action messages and the global lighting schedule event action messages. In response to determining that the existing schedule master controller is not the schedule master, failover application 236 determines that the first network controller 15 is a current schedule master of the lighting control schedule for the first plurality of network controllers on the first local network.

In response to determining that the first network controller 15 is the current schedule master, failover application 236 repeatedly sends, within a predetermined time period, to the first plurality of network controllers on the first local network and the at least two different schedule master controllers on the link network, a new schedule master message including a source identifier of the first network controller and identifying the first network controller 15 as the current schedule master for the first plurality of network controllers on the first local network. Execution of failover application 236, user interface application 239, and lighting control application 241 by the microprocessor 230 configures network controller 15 to perform the respective functions outlined above.

Figure 3:
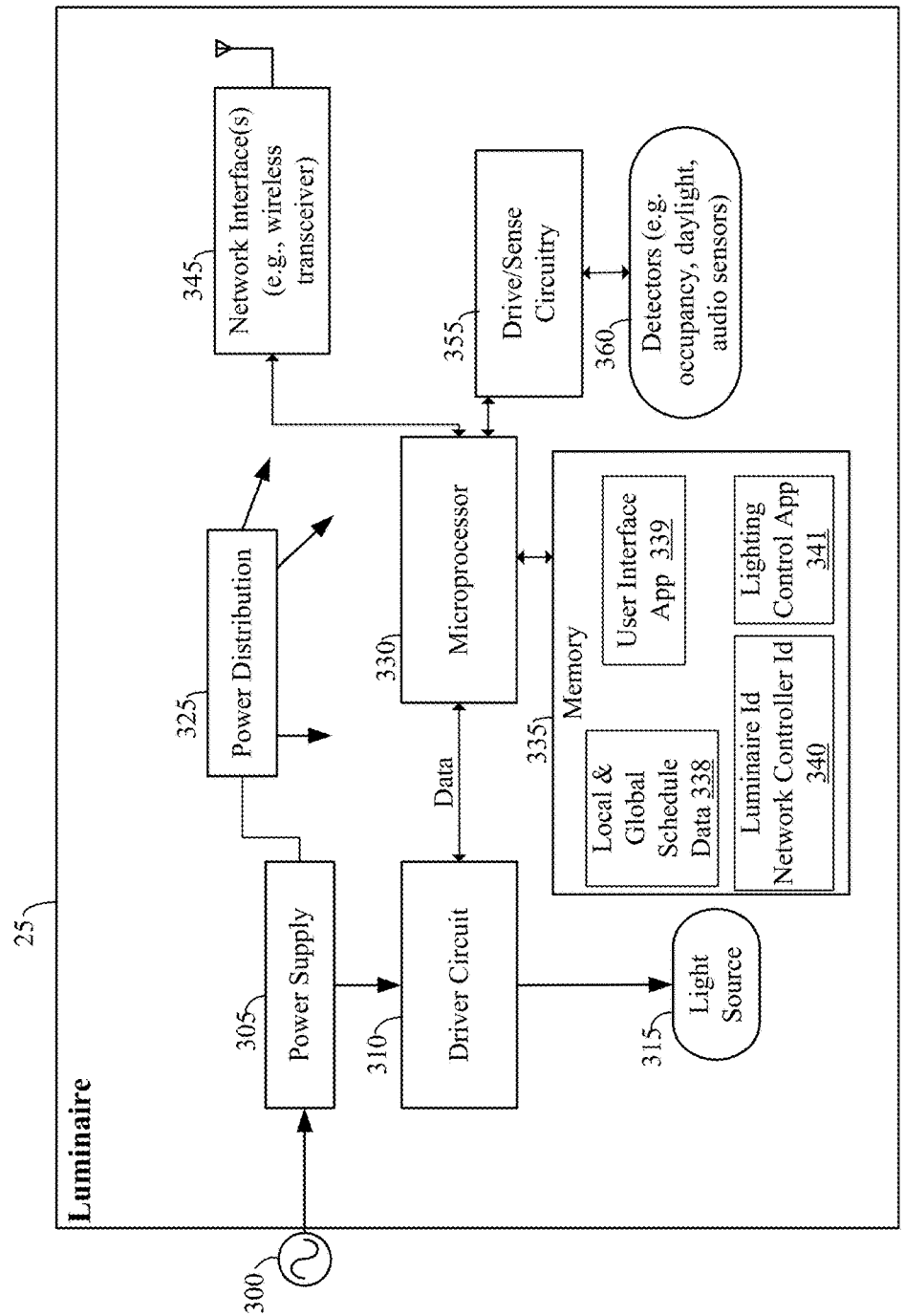
FIG. 3 is a block diagram of a luminaire that communicates via the lighting control system of FIG. 1.

FIG. 3 is a block diagram of a luminaire 25 that communicates via the lighting control system of FIG. 1. The circuitry, hardware, and software of luminaire 25 shown is similar to the network controller of FIGS. 2A-B. However, as shown, luminaire 25 can include a subset of the circuitry, hardware, and software shown for the network controller 15 of FIG. 2B.

Luminaire 25 may be a singularly addressable device designated by a luminaire identifier and is configured to operate as a member of a respective device network 60 as shown in FIG. 1, or a zone. Hence, the network interface(s) 345 of luminaire 25 may comprise a single radio for communication over device network 60, as opposed to the tri-band network communication interface of network controller 15 for communication over the three different types of networks 40, 50, 60. It should be understood that luminaire 25 may not necessarily include local and global schedule data 338 and user interface application 339 as part of the luminaire 25 structure, for example, to save on manufacturing and design costs.

Luminaire 25 is represented by a unique device identifier, such as a serial number, media access control (MAC) address, etc. In our example, the memory stores 335 stores a luminaire identifier that can be an alphanumeric identifier that uniquely identifies luminaire 25 on a given device network and a network controller identifier that uniquely identifies the network controller that manages the schedule for the luminaire. Upon receipt of a schedule event action message from the network controller at a luminaire 25, the luminaire 25 checks a source identifier in the schedule event action message to determine whether the source identifier matches the stored network controller identifier in the identifier database 340 in memory 335. The luminaire 25 also checks a destination identifier in the schedule event action message to determine whether the destination identifier matches the stored luminaire identifier in the identifier database 340 in memory 335.

The schedule event action message is discarded if the source identifier and the destination identifier checks are not determined to match. The schedule event action message is also discarded if it is a duplicate. If the source identifier and the destination identifier checks match, then the schedule event action message payload is extracted from the message and processed by the lighting control application 341 running on the processor 330 so that luminaire 25 acts in accordance with the scheduled event by adjusting (e.g., turns on/off or dims) light source 315. For example, the local and global schedule data 338 of the luminaire 25 is updated in accordance with the schedule event action message. The schedule event action message can then be acknowledged.

Although the block diagram for the luminaire 25 illustrates a variety of components, such as local and global schedule data 338, user interface application 339, and network interface(s) 345, it should be understood that the luminaire 25 may be a dumb device (e.g., with a microprocessor and sensor) for controlling LEDs, relays, or lighting fixtures themselves.

FIGS. 4A-B are block diagrams of lighting control devices 30 that communicate via the lighting control system of FIG. 1. The circuitry, hardware, and software of lighting control device 30 shown is similar to the network controller 15 of FIG. 2B and luminaire 25 of FIG. 3. However, lighting control device 15 is a device that processes lighting controls in order to control a luminaire 25, but typically does not itself include a light source for purposes of artificial illumination of a space intended for occupancy by a living organism (i.e., space lighting).

Lighting control device 30 may be a singularly addressable device designated by a lighting control device identifier and is configured to operate as a member of a respective device network 60 as shown in FIG. 1, or a zone. Hence, the network interface(s) 445 of lighting control device 30 may comprise a single radio for communication over device network, as opposed to the tri-band network communication interface of network controller 15 used to communicate over the three different types of networks 40, 50, 60.

Lighting control device 30 is represented by a unique device identifier and the memory stores 435 stores an identifier database 440 that has a lighting control device identifier, such as an alphanumeric identifier, that uniquely identifies lighting control device 30 on a given device network. The identifier database 440 in the memory 435 also stores a network controller identifier that uniquely identifies the network controller 15 that manages the schedule which lighting control device 30 adjusts.

Different schedule adjustment input types are shown for the lighting control device 30 in FIGS. 4A-B. As shown in FIG. 4A, the lighting control device 30 is a wall switch where the drive/sense circuitry 455 responds to switches 460. Switches 460 can be an on/off switch, dimmer switch, or set scene switch based on Acuity Brands Lighting's commercially available xPoint® Wireless ES7 product. In our example, lighting control device 30 includes a single shared button switch 460 for on/off, dimming, or set scene functions and the LED indicator 415A of lighting control device 30 communicates the load state. The lighting control application 441 generates schedule event action messages based on the received lighting control schedule adjustments.

Although the block diagrams for lighting control device 30 in FIGS. 4A-B illustrate a variety of components, such as local and global schedule data 438 and user interface application 439, it should be understood that, in an example, the lighting control device 30 may not have the local and global schedule data 438 because lighting control device 30 is controlled by network controllers 15A-N. Otherwise, the lighting control device 30 would need to necessarily have the memory requirements and knowledge about what to do with the schedule data. Hence, local and global schedule data 438 may reside only with network controllers 15A-N. Because the brains are kept relatively higher up, such that the luminaires 25A-N and lighting control devices 30A-N don't have to know about the schedules being turned on, turned off, occupancy detected, photocell (sunlight) levels detected, etc., this saves hardware and development costs of the lighting control system.

In FIG. 4B, the lighting control device 30 is a touch screen device where lighting control schedule adjustments are inputted via a user interface application 439 through manipulation or gestures on a touch screen 415B.

For output purposes, the touch screen 415B includes a display screen, such as a liquid crystal display (LCD) or light emitting diode (LED) screen or the like. For input purposes, touch screen 415B includes a plurality of touch sensors.

A keypad may be implemented in hardware as a physical keyboard of touch screen device 30, and keys may correspond to hardware keys of such a keyboard. Alternatively, some or all of the keys (and keyboard) of lighting control device 30 may be implemented as "soft keys" of a virtual keyboard graphically represented in an appropriate arrangement via touch screen 415B. The soft keys presented on the touch screen 415B may allow the user of lighting control device 30 to invoke the same user interface functions as with the physical hardware keys.

Drive/sense circuitry 455 is coupled to touch sensors of touch screen 415B for detecting the occurrence and relative location/position of each touch with respect to a content display area of touch screen 415B. In this example, drive/sense circuitry 455 is configured to provide microprocessor 430 with touch-position information based on user input received via touch sensors. In some implementations, microprocessor 430 is configured to correlate the touch position information to specific content being displayed within the content display area on touch screen 415B. The touch-position information captured by the drive/sense circuitry 455 and provided to microprocessor 430 may include, but is not limited to, coordinates identifying the location of each detected touch with respect to the display area of touch screen 415B and a timestamp corresponding to each detected touch position. Accordingly, the microprocessor 430 determines input of a lighting control event and generates generate schedule event action messages.

In general, touch screen 415B and its touch sensors (and one or more keys, if included) are used to provide a textual and graphical user interface for the lighting control device 30. In an example, touch screen 415B provides viewable content to the user at lighting control device 30. Touch screen 415B also enables the user to interact directly with the viewable content provided in the content display area, typically by touching the surface of the screen with a finger or an implement such as a stylus.

In FIG. 4B, the drive/sense circuitry 455 also responds to detectors 460 (e.g., occupancy, daylight, and audio sensors) that are on-board the lighting control device 30 to generate schedule event action messages. In response to the inputted or received lighting control schedule adjustments, the lighting control application 441 generates and transmits schedule event action messages based on the lighting control schedule adjustments. Each generated schedule event action message is sent to a network controller that the lighting control device is paired with over device network, for example, as a unicast message via network interface(s) 445. The lighting control device 30 embeds a source identifier in the schedule event action message, such as the stored lighting control device identifier in identifier database 440 and a destination identifier, such as the stored network controller identifier in identifier database 440. Upon receipt of the schedule event action message from the lighting control device 30, the network controller checks both parameters (the source identifier and the destination identifier) and schedules the event if the destination identifier belongs to the receiving network controller and the source identifier belongs to a lighting control device on its respective network.

Figure 5A:
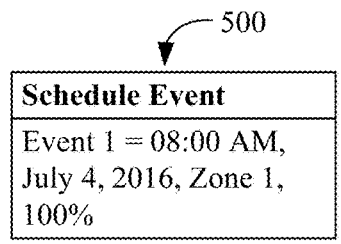
FIG. 5A is a schedule event system entity that represents a lighting control event for scheduling.

FIG. 5A is a schedule event system entity 500 that represents a lighting control event for scheduling. As shown, schedule event 500 includes schedule event data (also referred to herein as "event data"), including, for example, an event identifier (event 1), an event time that is a time setting (08:00 AM), an event date that is a date setting (Jul. 4, 2016), a zone identifier setting (zone 1), and a light intensity adjustment (100%). The schedule event 500 represents an action and defined parameters, and time configuration for when the lighting control event will occur according to the scheduled assignment. The schedule event 500 can contain local data or global data references depending on user configuration. In the illustration, the schedule event 500 pertains to a lighting intensity or brightness adjustment to 100% at 8:00 AM for zone 1, whereby zone represents a grouping of like-controlled dimmable fixtures. It should be appreciated that the schedule event may include other adjustments besides or in addition to the light intensity adjustment (e.g., lumen output or photometric distribution), such as a color adjustment (e.g., color point) or a color temperature adjustment (e.g., correlated color temperature).

Figure 5B:
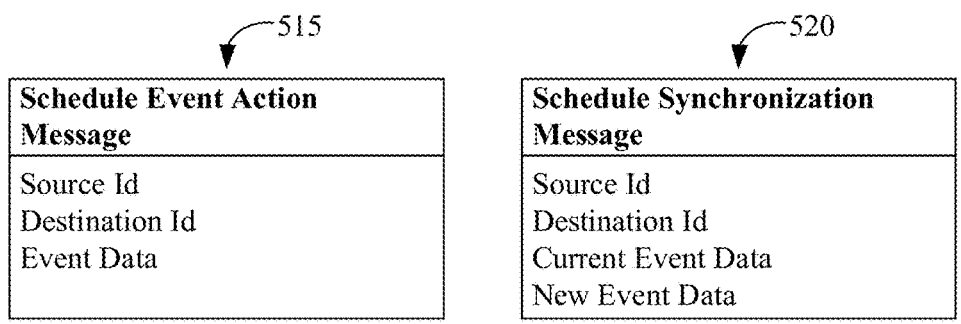
FIG. 5B is a schedule event action message that is sent upon occurrence of the schedule event of FIG. 5A and a schedule synchronization message.

FIG. 5B is a schedule event action message 515 that is sent upon occurrence or generation of the schedule event system entity 500 and a schedule synchronization message 520. In the example, the schedule event action message 515 includes a source identifier, a destination identifier, and an event data. The schedule event action message 515 is sent upon a scheduled event occurrence or generation which indicates network controller(s) on a given local network or other local networks must take action according to the contents of the schedule event action message, local data parameters, or global data parameters. In one instance, a schedule event action message 515 may contain local data pertaining to controlling a luminaire on a specific network controller. In another instance, a schedule event action message may contain global data pertaining to controlling multiple luminaires associated with many network controllers on different local networks. Schedule event action message 515 can be relayed by the schedule master on a given local network to another local network via the link network.

Schedule synchronization message 520 is sent upon a change to a schedule or schedule events by user-interaction. As shown, the schedule synchronization message 520 includes a source identifier, a destination identifier, current schedule event data, and new schedule event data. For example, the schedule synchronization message 520 also contains the original or current schedule event data and the new or modified schedule event data, including event time, event date, light intensity adjustment, and other parameters. When a schedule synchronization message 520 is received by a network controller, the stored schedule data (e.g., local and global data) is updated as well as the currently active schedule.

Figure 5C:
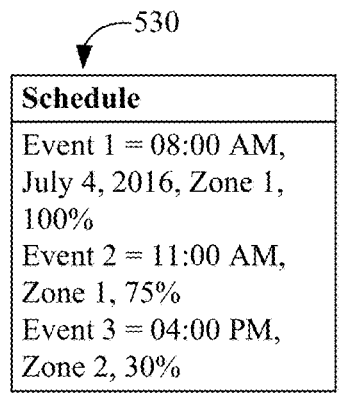
FIG. 5C is a schedule system entity that includes a sequence of schedule events of FIG. 5A.

FIG. 5C is a schedule system entity 530 that includes a sequence of schedule events of FIG. 5A. The schedule system entity 530 can be assigned to a day, weekday, or any range of days in which a sequence of lighting control events occurs in order at specified times with defined actionable parameters. The contents of the parameters determine further network control messages or localized control of luminaires connected to a given network controller. As shown, three lighting control events are included in the schedule. A first scheduled event is represented by event identifier (event 1), event time (08:00 AM), event date (Jul. 4, 2016), zone identifier setting (zone 1), and light intensity adjustment (100%). A second scheduled event is represented by event identifier (event 2), event time (11:00 AM), zone identifier setting (zone 1), and light intensity adjustment (75%). A third scheduled event is represented by event identifier (event 3), event time (4:00 PM), zone identifier setting (zone 2), and light intensity adjustment (30%).

Figure 5D:
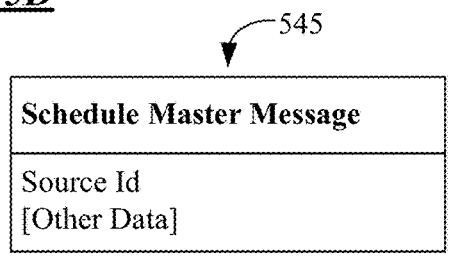
FIG. 5D is a schedule master message sent periodically which acts as a keep-alive pertaining to online/offline status and the role of a network controller being that of a schedule master controller.

FIG. 5D is a schedule master message 545 sent periodically which acts as a keep-alive pertaining to online/offline status and the role of a network controller being that of a schedule master controller. The period of the schedule master message 545 may vary, but is typically once a second. The schedule master message 545 is a broadcast both on link network and local network. If a schedule master message 545 is received from a network controller with a lower numeric identifier, the receiving network controller will ignore the state transition to become a schedule master and relinquish its current schedule master role and update its knowledge of who the schedule master is. Otherwise, the network controller will become the schedule master. For example, multiple network controllers may temporarily become the schedule master only until a new schedule master begins broadcasting again. The schedule master message 545 is transmitted on a local network to coordinate the schedule master process. Of note, the transition in schedule master, race condition to become schedule master, and running of a new event is insignificant compared to having some level of autonomy in a failure event.

FIG. 6 is a block diagram of a lighting control system showing storage of the schedule of FIG. 5C and schedule process communications, such as transmission of the schedule event action message of FIG. 5B and the schedule master message of FIG. 5D. In the illustrated schedule process, the current date and time is continually evaluated to determine whether a schedule event action message should be generated based on a schedule event, local data, and global data. For example, the schedule 530 is compared against a real time clock of schedule master controller 15A, such as by comparing the current date and time against the list of schedule events within the schedule currently assigned 530. Alternatively or additionally, the schedule events are also evaluated to determine whether a schedule event action message 515 should be generated. Even if the event date and event time of a schedule event are satisfied by the current date and time, a schedule event action message 515 may not be generated and transmitted when local or global data override the schedule event.

In the illustrated example, schedule master controller 15A determines that the event date and event time of a schedule event is present or will occur in the future and is not overridden by local data relating to local network 50A. Hence, schedule master controller 15A transmits schedule event action message 515 on local network 50A to network controllers 15B-C. Moreover, schedule master controller 15A determines that the event date and event time of a schedule event is present or will occur in the future and is not overridden by global data relating to link network 40. Hence, schedule master controller 15A transmits schedule event action message 515 on link network 40 to network controllers 15D-N.

As further shown in FIG. 6, a schedule master message 545A as described with reference to FIG. 5D is broadcast on local network 50A by schedule master controller 15A. A schedule master message 545B is also transmitted on local network 50B by schedule master controller 15D.

FIGS. 7A-B are flow charts illustrating schedule process communications of the network controllers and schedule master controllers of FIG. 1. In FIG. 7A, initially, in block S700, a network controller 15 receives a schedule event action message. The schedule event action message contains data related to controlling a luminaire that is in communication with network controller 15 via local network. Thus, the network controller 15 executes the schedule event action in block S705 by, for example, transmitting a lighting control adjustment message to the respective luminaire via device network to turn the lights on/off, dim up/down, or set scene (e.g., a predetermined light setting).

In FIG. 7B, beginning in block S710, the network controller 15 evaluates schedule events and acts upon the schedule events by checking if the event date and event time of the schedule event is satisfied by the current date and current time. If the event date and event time of the schedule event are not satisfied, then block S715 loops back to S710 so the evaluation can iteratively continue. But if network controller 15 determines that the event date and event time of the schedule event are triggered, then block S720 is entered. Moving to block S725, if the schedule event is a local event, then the network controller 15 executes the schedule event action as described in S705 and may transmit a corresponding schedule event action message to other network controllers on its respective local network.

In block S730, if the schedule event data is determined to be global, then block S735 is entered. The network controller 15 determines whether it is the schedule master in block S735. If the network controller 15 determines that it is the schedule master, then network controller 15 will also execute the schedule event action in S740 as described in block S705. In addition, as shown in block S745, the network controller 15 transmits a schedule event action message, for example, by transmitting the message on the link network 40 and to other network controllers on its respective local network.

Figure 8B:
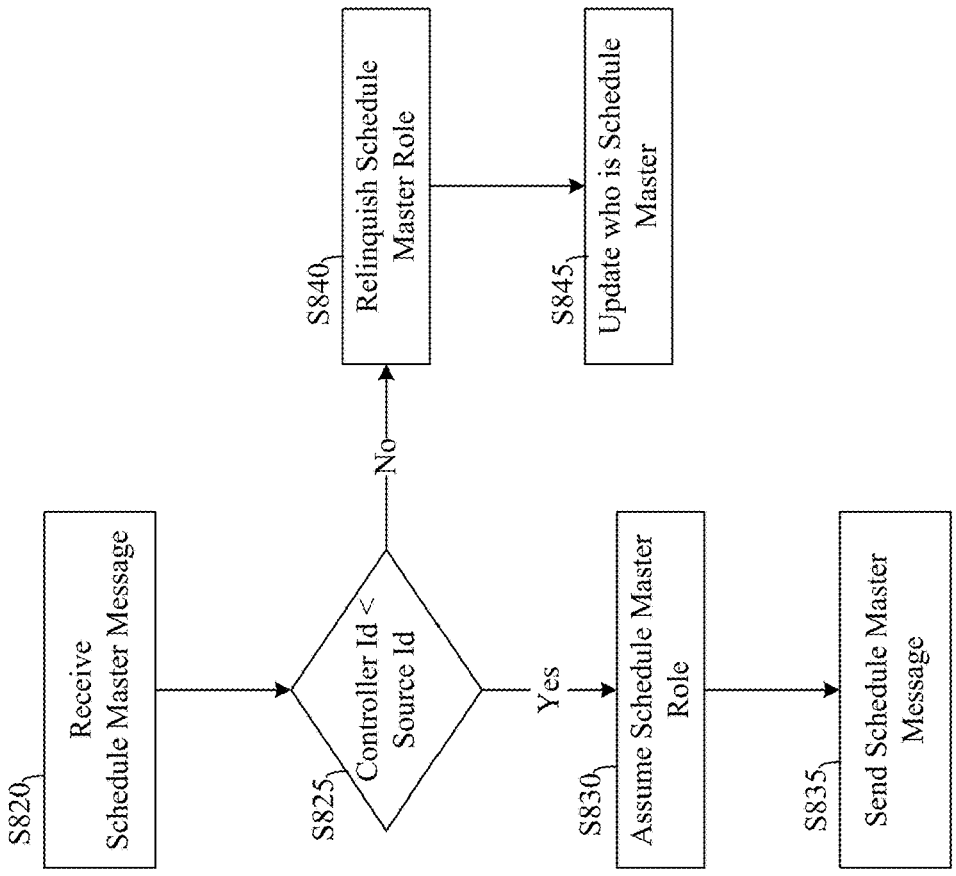
FIGS. 8A-B are flow charts of a schedule master protocol procedure for scheduling failover that is executed by the network controllers and schedule master controllers of FIG. 1.
Figure 8A:
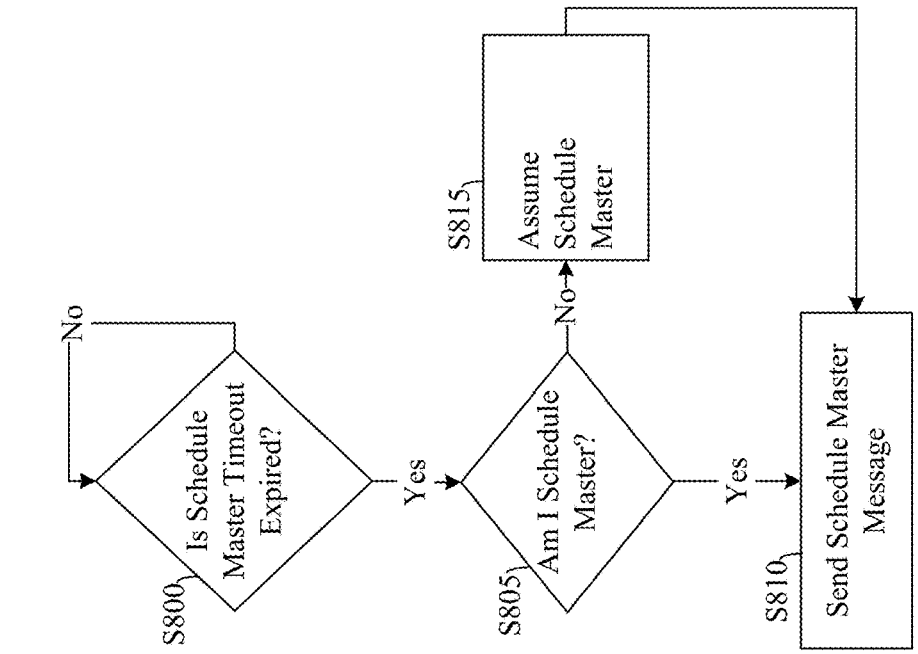

FIGS. 8A-B are flow charts of a schedule master protocol procedure for scheduling failover that is executed by the network controllers and schedule master controllers of FIG. 1. In FIG. 8A, beginning with block S800, a network controller continually evaluates the current state of the schedule master role by determining if a schedule master timeout period has expired, and then determining if or when the network controller should attempt to become a schedule master. The schedule master timeout period is a period of time when the network controller will attempt to change from being a regular network controller to the role of the schedule master should a schedule master message fail to be received. A typical timeout to wait is five seconds of inactivity for reception of the schedule master message.

Moving to block S805, if the network controller determines the schedule master timeout period has expired, then the network controller checks whether the network controller itself is actually the current schedule master. In block S810, if the network controller itself is actually the current schedule master, then the network controller broadcasts a schedule master message to local network and optionally to link network. If the network controller is not the current schedule master, then in block S815, the network controller assumes it is the schedule master and transmits a schedule master message as in block S810. Network controller also stores its own network controller identifier in memory as the schedule master identifier.

Beginning in block S820 of FIG. 8B, the network controller receives a schedule master message from a different network controller after already assuming it is the schedule master. In S825, the network controller determines if its own network controller identifier is less than the controller identifier embedded as the source identifier parameter of the different network controller that transmitted the schedule master message. If its own network controller identifier is less than the source identifier in the received schedule master message, then in block S830, the network controller assumes it is still the schedule master. Accordingly, in block S835, the network controller sends a schedule master message across the local network and optionally to link network again.

As shown in block S840, if the network controller identifier of the network controller is actually greater than or equal to the source identifier in the received schedule master message, then the network controller relinquishes the schedule master role. Finishing now in block S845, the network controller then changes the schedule master identifier stored in memory to the source identifier in the received schedule master message.

Figure 9A:
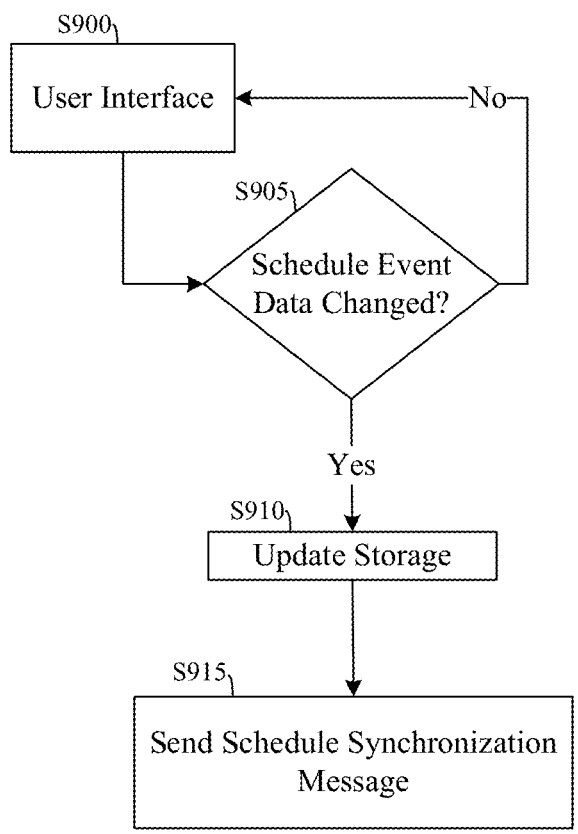
FIGS. 9A-B are flow charts of a schedule synchronization procedure executed by the network controllers and schedule master controllers of FIG. 1.
Figure 9B:
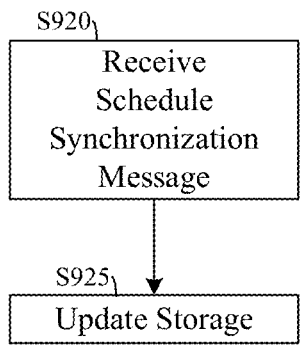

FIGS. 9A-B are flow charts of a schedule synchronization procedure executed by the network controllers and schedule master controllers of FIG. 1. In FIG. 9A, beginning in block S900, a user interface application is used to change a lighting control schedule. In block S905, a lighting control application iteratively determines whether a schedule event change has been made, which occurs, for example, when a new schedule event is created or an existing schedule event is changed. If no schedule event data has been changed, block S900 is looped back to. However, if data of a schedule event is changed (e.g., event date, event time, lighting intensity adjustment, etc.), then the stored schedule data (e.g., local and global schedule data) and the currently active schedule of the network controller is updated in its memory storage, as shown in block S910.

Continuing now to block S915, the network controller applies system configuration, local data, and global data changes to its memory storage, and distributes the changes to each network controller on the local and link networks automatically via a schedule synchronization message. This automatic synchronization process sends schedule synchronization messages as needed to propagate a change originating from one network controller regarding schedules across the link network and local network to other network controllers. Schedule synchronization messages are sent from the network controller where the change was made and is sent to other network controllers on the link network and local network ensuring that the change is made to all network controllers and their stored schedules. Hence, a schedule synchronization message is sent upon a change to a schedule or schedule events by user-interaction.

As shown in FIG. 9B, in block S920, the schedule synchronization message is received by other network controllers. The schedule synchronization message contains the original or current event data and the new or modified event data. Event data contains the event time, action (lighting control adjustment), and other parameters (e.g., identifiers of luminaires to adjust by referencing respective network controller identifier(s), respective network identifiers(s), or specific luminaire identifier(s)). Moving to block S925, upon receiving the schedule synchronization message, the receiving network controller updates the stored schedule data (e.g., local and global schedule data) and the currently active schedule of the receiving network controller in its memory storage.

Figure 10:
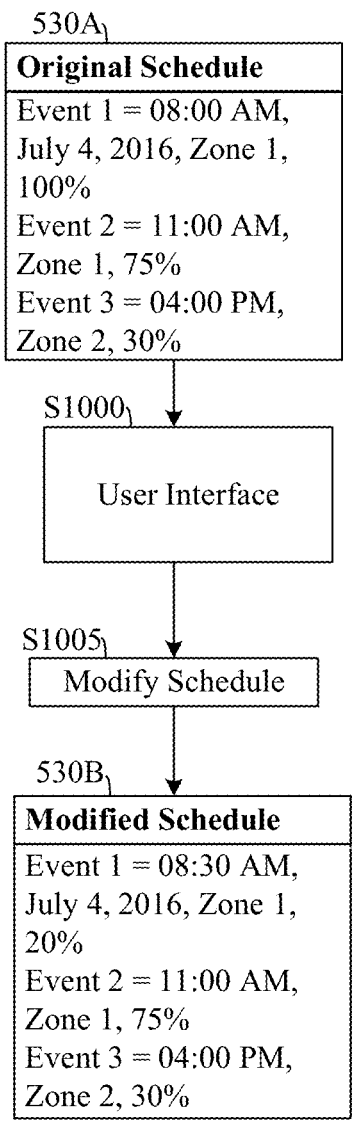
FIG. 10 is a flow chart presenting schedule modification via a lighting control device or network controller of FIG. 1.

FIG. 10 is a flow chart presenting schedule modification via a lighting control device or network controller of FIG. 1. As shown in block S1000, a user interface application of lighting control device or network controller receives as input an original schedule 530A. The user interface application is used to modify the original schedule as shown in block S1005. As a result, a modified schedule 530B is propagated across local network and optionally a link network by network controller.

FIG. 11 is a block diagram of a lighting control system showing automatic schedule synchronization process communications, such as transmission of the schedule synchronization message of FIG. 5B. In the illustrated automatic schedule synchronization process, the user interface application has been used to modify the original schedule 530. Schedule master controller 15A determines that a schedule synchronization message 520 should be sent upon a change to schedule 530 or schedule events by the user interaction. The schedule synchronization message 520 contains the original or current event data and the new or modified event data. The original or current event data contains the original event data, including, for example, an event identifier (event 1), an event time (08:00 AM), an event date (Jul. 4, 2016), a zone identifier (zone 1), and a light intensity adjustment (100%). The new or modified event data includes new or changed event data, such as a new event identifier (if a modification has been made then the event identifier will not change), an adjustment to the event time, an adjustment to the event date, an adjustment to the zone identifier setting, an adjustment to the lighting intensity adjustment, and other parameters (e.g., identifiers of luminaires to adjust by referencing respective network controller identifier(s), respective network identifiers(s), or specific luminaire identifier(s)).

As shown, the schedule master controller 15A transmits the schedule synchronization message 520 on local network 50A to network controllers 15B-C. Moreover, schedule master controller 15A determines that the schedule event includes global data that identify adjustments to make to luminaires coupled to network controllers 15D-N on a separate local network 50B. Hence, schedule master controller 15A also transmits the schedule synchronization message 520 via the link network 40 to network controllers 15D-N.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method comprising:
connecting from a first network controller of a first plurality of network controllers to a network, wherein:
  connecting from the first network controller to the network includes designating the first network controller with a controller identifier that is unique to the first network controller and a network identifier that represents a logical collection of the first plurality of network controllers on the network, and
  the first plurality of network controllers control a respective luminaire directly or indirectly via a lighting control device;
receiving, within a timeout period, at the first network controller, a first schedule master message from a second network controller of the first plurality of network controllers via the network, the first schedule master message including a source identifier of the second network controller and identifying the second network controller as a schedule master of a lighting control schedule having a sequence of lighting control events for the first plurality of network controllers on the network;
adjusting the respective luminaire controlled by the first network controller in accordance with the lighting control schedule;
upon failing to receive, within the timeout period, the schedule master message from the second network controller via the network, determining that the first network controller is the schedule master; and
upon determining that the first network controller is the schedule master, transmitting, from the first network controller, a second schedule master message to the first plurality of network controllers indicating that the first network controller is the schedule master via the network,
wherein the transmitted second schedule master message includes the controller identifier of the first network controller as the source identifier.

2. The method of claim 1, further comprising:
receiving a third schedule master message from a third network controller of the first plurality of network controllers indicating that the third network controller is the schedule master, wherein the third schedule master includes the controller identifier of the third network controller as the source identifier;
comparing the controller identifier of the first network controller with the third network controller; and
based on the comparison, designating the first network controller or the third network controller as the schedule master.

3. The method of claim 2,
wherein comparing the controller identifier of the first network controller with the third network controller includes determining which controller identifier is numerically lower, and
wherein designating the first network controller or the third network controller as the schedule master includes upon determining that the first network controller has the numerically lower controller identifier, maintaining the first network controller as the schedule master.

4. The method of claim 2,
wherein comparing the controller identifier of the first network controller with the third network controller includes determining which controller identifier is numerically lower, and
wherein designating the first network controller or the third network controller as the schedule master includes upon determining that the third network controller has the numerically lower controller identifier, designating the third network controller as the schedule master.

5. The method of claim 4, wherein designating the third network controller as the schedule master includes storing the controller identifier of the third network controller as a schedule master identifier.

6. The method of claim 4, further comprising:
after designating the third network controller as the schedule master, receiving a schedule event action message including a lighting schedule event that includes a lighting intensity or brightness adjustment and an event time to make the lighting intensity or brightness adjustment, the source identifier of the third network controller, and a destination identifier that includes the controller identifier of the first network controller; and adjusting the respective luminaire in accordance with the received schedule event action message from the third network controller.

7. The method of claim 1, further comprising:

connecting from the first network controller to a link network, wherein the link network includes a second plurality of network controllers designated as the schedule master for a respective LAN; and in response to determining that the first network controller is the schedule master, broadcasting on the link network, from the first network controller, the second schedule master message to the second plurality of network controllers indicating that the first network controller is the schedule master.

8. The method of claim 7, further comprising:

after broadcasting on the link network the second schedule master message, sending a schedule event action message including the source identifier of the first network controller, a destination identifier, and a lighting schedule event, and wherein the lighting schedule event is a lighting intensity or brightness adjustment and a time to make the lighting intensity or brightness adjustment.

9. The method of claim 8, wherein the destination identifier of the schedule event action message identifies a different network, network controller on the different network, or a zone that is a grouping of luminaires controlled by network controllers that are spread across different networks and are controlled in a same manner.

10. The method of claim 8, wherein the schedule event action message further includes an event date that is assigned to a day, weekday, or range of days to make the lighting intensity or brightness adjustment, and the schedule event action message is sent upon determining that the event date and the event time is triggered.

11. The method of claim 1, further comprising:

connecting to the respective luminaire from the first network controller via a lighting-centric wireless communication network separate from the network.

12. The method of claim 1, wherein the respective luminaire is a dimmable light fixture.

13. A method comprising:

connecting from a first network controller of a first plurality of network controllers to a network, wherein the first plurality of network controllers control a respective luminaire directly or indirectly via a lighting control device;

receiving, within a timeout period, at the first network controller, a first schedule master message from a second network controller of the first plurality of network controllers via the network, the first schedule master message including a source identifier of the second network controller and identifying the second network controller as a schedule master of a lighting control schedule having a sequence of lighting control events for the first plurality of network controllers on the network;

adjusting the respective luminaire controlled by the first network controller in accordance with the lighting control schedule;

upon failing to receive, within the timeout period, the schedule master message from the second network controller via the network, determining that the first network controller is the schedule master;

upon determining that the first network controller is the schedule master, transmitting, from the first network controller, a second schedule master message to the first plurality of network controllers indicating that the first network controller is the schedule master via the network;

after transmitting the second schedule master message to the first plurality of network controllers indicating that the first network controller is the schedule master via the network, receiving input, via a user interface of the first network controller, to adjust a group of luminaires controlled by the first plurality of network controllers of the network;

generating a lighting schedule event based on the received input to adjust luminaires, the lighting schedule event including a lighting intensity or brightness adjustment and an event time to make the lighting intensity or brightness adjustment to the group of luminaires controlled by the first plurality of network controllers of the network; and sending a schedule synchronization message to the first plurality of network controllers on the network that includes the source identifier of the first network controller, a destination identifier identifying the first plurality of network controllers, the generated lighting schedule event, and the lighting control schedule of the schedule master.

14. The method of claim 13, further comprising:

upon generating the lighting schedule event, storing the generated lighting schedule event in persistent or volatile storage of the first network controller as configuration or control data representing status of the lighting intensity or brightness adjustment for a zone corresponding to the group of luminaires controlled by the first plurality of network controllers of the network.

15. A method comprising:

connecting from a first network controller of a first plurality of network controllers to a network, wherein the first plurality of network controllers control a respective luminaire directly or indirectly via a lighting control device;

receiving, within a timeout period, at the first network controller, a first schedule master message from a second network controller of the first plurality of network controllers via the network, the first schedule master message including a source identifier of the second network controller and identifying the second network controller as a schedule master of a lighting control schedule having a sequence of lighting control events for the first plurality of network controllers on the network;

adjusting the respective luminaire controlled by the first network controller in accordance with the lighting control schedule, wherein adjusting the respective luminaire controlled by the first network controller in accordance with the lighting control schedule comprises:

receiving a schedule synchronization message that includes a lighting schedule event that is a lighting intensity or brightness adjustment, an event date and an event time to make the lighting intensity or brightness adjustment, the source identifier of the second network controller, and a destination identifier identifying the first network controller;

storing the schedule synchronization message by updating the lighting control schedule stored in local persistent or volatile storage of the first network controller;

evaluating the lighting control schedule to determine if the event date and the event time is triggered; and upon determining the event date and the event time is triggered, changing illumination of the respective luminaire based on the lighting intensity or brightness adjustment of the lighting schedule event;

upon failing to receive, within the timeout period, the schedule master message from the second network controller via the network, determining that the first network controller is the schedule master; and upon determining that the first network controller is the schedule master, transmitting, from the first network controller, a second schedule master message to the first plurality of network controllers indicating that the first network controller is the schedule master via the network.

16. A method comprising:

connecting from a first network controller of a first plurality of network controllers to a network, wherein the first plurality of network controllers control a respective luminaire directly or indirectly via a lighting control device;

receiving, within a timeout period, at the first network controller, a first schedule master message from a second network controller of the first plurality of network controllers via the network, the first schedule master message including a source identifier of the second network controller and identifying the second network controller as a schedule master of a lighting control schedule having a sequence of lighting control events for the first plurality of network controllers on the network, wherein the first schedule master message is received at the first network controller from the second network controller with a periodicity of 1 second;

adjusting the respective luminaire controlled by the first network controller in accordance with the lighting control schedule;

upon failing to receive, within the timeout period, the schedule master message from the second network controller via the network, determining that the first network controller is the schedule master; and upon determining that the first network controller is the schedule master, transmitting, from the first network controller, a second schedule master message to the first plurality of network controllers indicating that the first network controller is the schedule master via the network.

17. A method comprising:

connecting from a first network controller of a first plurality of network controllers to a network, wherein the first plurality of network controllers control a respective luminaire directly or indirectly via a lighting control device;

receiving, within a timeout period, at the first network controller, a first schedule master message from a second network controller of the first plurality of network controllers via the network, the first schedule master message including a source identifier of the second network controller and identifying the second network controller as a schedule master of a lighting control schedule having a sequence of lighting control events for the first plurality of network controllers on the network, wherein the timeout period is 5 seconds;

adjusting the respective luminaire controlled by the first network controller in accordance with the lighting control schedule;

upon failing to receive, within the timeout period, the schedule master message from the second network controller via the network, determining that the first network controller is the schedule master; and upon determining that the first network controller is the schedule master, transmitting, from the first network controller, a second schedule master message to the first plurality of network controllers indicating that the first network controller is the schedule master via the network.

18. A first network controller comprising:

a network communication interface system configured for data communication for:

communication of a local lighting schedule event action message, over a local network, with a first plurality of network controllers in communication over the local network that includes the first network controller;

communication of a global lighting schedule event action message, over a link network, of at least two different schedule master controllers, the two different schedule master controllers connected to a separate network of respective network controllers; and communication, over a lighting device network, with a dimmable luminaire to adjust lighting intensity of the dimmable luminaire based on the local lighting schedule event action message and the global lighting schedule event action message;

a processor coupled to the network communication interface system;

a touch screen to receive user input of a local lighting control event to adjust a local group of luminaires controlled by the first plurality of network controllers on the local network to a first light intensity level at a first event time by generating the local lighting schedule event action message and further receive user input of a global lighting control event to adjust a global group of luminaires controlled by the at least two different schedule master controllers to a second light intensity level at a second event time by generating the global lighting schedule event action message;

a memory accessible to the processor; and programming in the memory which configures the processor to:

upon failing to receive, within a timeout period, a schedule master message from an existing schedule master controller of the first plurality of network controllers via the local network, determine that the existing schedule master controller is not a schedule master of a lighting control schedule for the first plurality of network controllers on the local network, wherein the lighting control schedule includes a sequence of lighting control events based on the local lighting schedule event action message and the global lighting schedule event action message;

in response to determining that the existing schedule master controller is not the schedule master, determine that the first network controller is a current schedule master of the lighting control schedule for the first plurality of network controllers on the local network; and in response to determining that the first network controller is the current schedule master, repeatedly send, within a predetermined time period, to the first plurality of network controllers on the local network and the at least two different schedule master controllers on the link network, a new schedule master message including a source identifier of the first network controller and identifying the first network controller as the current schedule master for the first plurality of network controllers on the local network.

19. The first network controller of claim 18, wherein the programming in the memory further configures the processor to:

send the local lighting schedule event action message to the first plurality of network controllers on the local network, the lighting schedule event action message including the first light intensity level and the first event time to adjust to the first light intensity level; and send the global lighting schedule event action message to the at least two different master schedule network controllers on the link network, the global lighting schedule event action message including the second light intensity level and the second event time to adjust to the second light intensity level.

* * * * *